(12) United States Patent
Krishnaswamy

(10) Patent No.: US 8,385,240 B2
(45) Date of Patent: Feb. 26, 2013

(54) SELECTION AND UTILIZATION OF SHARED WIRELESS WIDE AREA NETWORK MODEMS

(75) Inventor: Dilip Krishnaswamy, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 632 days.

(21) Appl. No.: 12/553,267

(22) Filed: Sep. 3, 2009

(65) Prior Publication Data

US 2011/0051642 A1   Mar. 3, 2011

(51) Int. Cl.
   *G08C 17/00*  (2006.01)
(52) U.S. Cl. ............... 370/311; 370/400; 370/328
(58) Field of Classification Search ............ None
   See application file for complete search history.

(56) References Cited

U.S. PATENT DOCUMENTS 6,957,069 B2 * 10/2005 Shah et al. ............ 455/436
2008/0192666 A1   8/2008 Koskan et al.

FOREIGN PATENT DOCUMENTS

| EP | 1835668 A1 | 9/2007 |
|---|---|---|
| EP | 2048908 A1 | 4/2009 |
| WO | WO2006134562 A2 | 12/2006 |

OTHER PUBLICATIONS

International Search Report and Written Opinion—PCT/US2010/047864, International Search Authority—European Patent Office—Feb. 17, 2011.

* cited by examiner

*Primary Examiner* — Bob Phunkulh
(74) *Attorney, Agent, or Firm* — Darren M. Simon

(57) ABSTRACT

A device chooses to use any one of a number of nodes with wireless wide area network (WWAN) modems, depending on whether utilization of one of the nodes will mitigate the power consumption of the device. The choice might also be a function of an energy level of the nodes. The choice can also be based on a link performance indicator. The chosen node is selected as a WWAN modem for communication and utilizes the identity of the device for application data services being supported in this mode.

39 Claims, 16 Drawing Sheets

SELECTION AND UTILIZATION OF SHARED WIRELESS WIDE AREA NETWORK MODEMS

BACKGROUND

I. Field

The following description relates generally to communication networks and more particularly to energy conservation and distributed processing though the use of shared wireless wide area network modems.

II. Background

Wireless communication systems are widely deployed to provide various types of communication content such as voice, data, and so on. These systems may be multiple-access systems capable of supporting communication with multiple users by sharing available system resources (e.g., bandwidth and transmit power). Examples of such multiple-access systems include code division multiple access (CDMA) systems, time division multiple access (TDMA) systems, frequency division multiple access (FDMA) systems, orthogonal frequency division multiple access (OFDMA) systems, and other systems.

A typical wireless communication network (e.g., employing frequency, time, and code division techniques) includes one or more base stations that provide a coverage area and one or more mobile (e.g., wireless) terminals that can transmit and receive data within the coverage area. A typical base station can concurrently transmit multiple data streams for broadcast, multicast, and/or unicast services, wherein a data stream is a stream of data that can be of independent reception interest to a mobile terminal. A mobile terminal within the coverage area of that base station can be interested in receiving one, more than one, or all data streams carried by the composite stream. Likewise, a mobile terminal can transmit data to the base station or another mobile terminal.

When a user desires to communicate over a network, that user operates a device and a modem of the device is utilized to perform the communication functions. However, this can consume the device's energy, which can become a concern especially if the user is not near a power source. Further, at times a quality of the device's link might be low, resulting in signal degradation, which can negatively affect the user's communication experience.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with sharing wireless wide area network modems to conserve energy for network, nodes, or both network and nodes. Further, modem sharing can result in improved network resource utilization and improved wireless wide area network link performance for client applications. Additionally, the disclosed aspects can mitigate delay as a function of selection of a network link.

According to an aspect is a method performed by a mobile device for selecting a wireless wide area network communicator. Method includes evaluating an energy consumption level for each of a plurality of nodes. Each of the plurality of nodes comprises a wireless wide area network modem. Method also includes selecting one node from the plurality of nodes as a wireless wide area network communicator. The selecting is a function of mitigation of an energy consumption level of mobile device. Further, method includes utilizing a credential of mobile device to communicate with wireless wide area network through the one node selected as wireless wide area network communicator.

Another aspect relates to a wireless communications apparatus that includes a memory and a processor. Memory retains instructions related to determining if an energy level of wireless communications apparatus is mitigated by usage of a communicator selected from a plurality of communicators. Memory also retains instructions related to selecting the communicator and supplying a credential of wireless communications apparatus to communicator. Additionally, memory retains instructions related to communicating with a wireless wide area network through a modem of communicator with credentials of wireless communications apparatus. Processor is coupled to memory and is configured to execute instructions retained in memory.

A further aspect relates to a wireless communications apparatus that selects a communicator for exchanging traffic with a wireless wide area network. Apparatus includes means for evaluating whether an energy level of wireless communications apparatus is mitigated by usage of a communicator selected from a plurality of communicators. Apparatus also includes means for selecting the communicator and means for supplying a credential of wireless communications apparatus to communicator. Further, apparatus includes means for communicating with a wireless wide area network through a modem of communicator with credentials of wireless communications apparatus.

Still another aspect relates to a computer program product comprising a computer-readable medium. Computer-readable medium includes a first set of codes for causing a computer to evaluate an energy consumption level for each of a plurality of nodes. Each of the plurality of nodes comprises a wireless wide area network modem. Computer-readable medium also includes a second set of codes for causing the computer to select one node from the plurality of nodes as a wireless wide area network communicator. The selecting is a function of mitigation of an energy consumption level of a mobile device. Further, computer-readable medium includes a third set of codes for causing the computer to utilize a credential of mobile device to communicate with wireless wide area network through the one node selected as wireless wide area network communicator.

Another aspect relates to at least one processor configured to select a wireless wide area network communicator. Processor includes a first module for evaluating whether an energy level is mitigated by usage of a communicator selected from a plurality of communicators. Processor also includes a second module for selecting the communicator and a third module for supplying a credential to the communicator. Further, processor includes a fourth module for communicating with a wireless wide area network through a modem of the communicator with the credentials.

Another aspect relates to a method, performed by a node, for receiving packets intended for a client device in a wireless wide area network. Method includes receiving packets from wireless wide area network, wherein the packets are intended for client device. Method also includes conveying the packets from wireless wide area network to client device. The node was selected by client device to mitigate resource consumption at client device.

Yet another aspect relates to a wireless communications apparatus comprising a memory and a processor. Memory retains instructions related to receiving packets from a wireless wide area network. The packets are intended for a client device. Memory retains further instructions related to conveying the packets from wireless wide area network to client device. Wireless communications apparatus was selected by client device to mitigate resource consumption at client device. Processor is coupled to memory and is configured to execute instructions retained in memory.

A further aspect relates to a wireless communications apparatus that includes means for receiving packets from a wireless wide area network, wherein the packets are intended for a client device. Wireless communications apparatus also includes means for determining a best estimate of received packets and means for conveying the packets from wireless wide area network to client device. Wireless communications apparatus was selected by client device to mitigate resource consumption at client device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of the various aspects may be employed. Other advantages and novel features will become apparent from the following detailed description when considered in conjunction with the drawings and the disclosed aspects are intended to include all such aspects and their equivalents.

DETAILED DESCRIPTION

Figure 1:
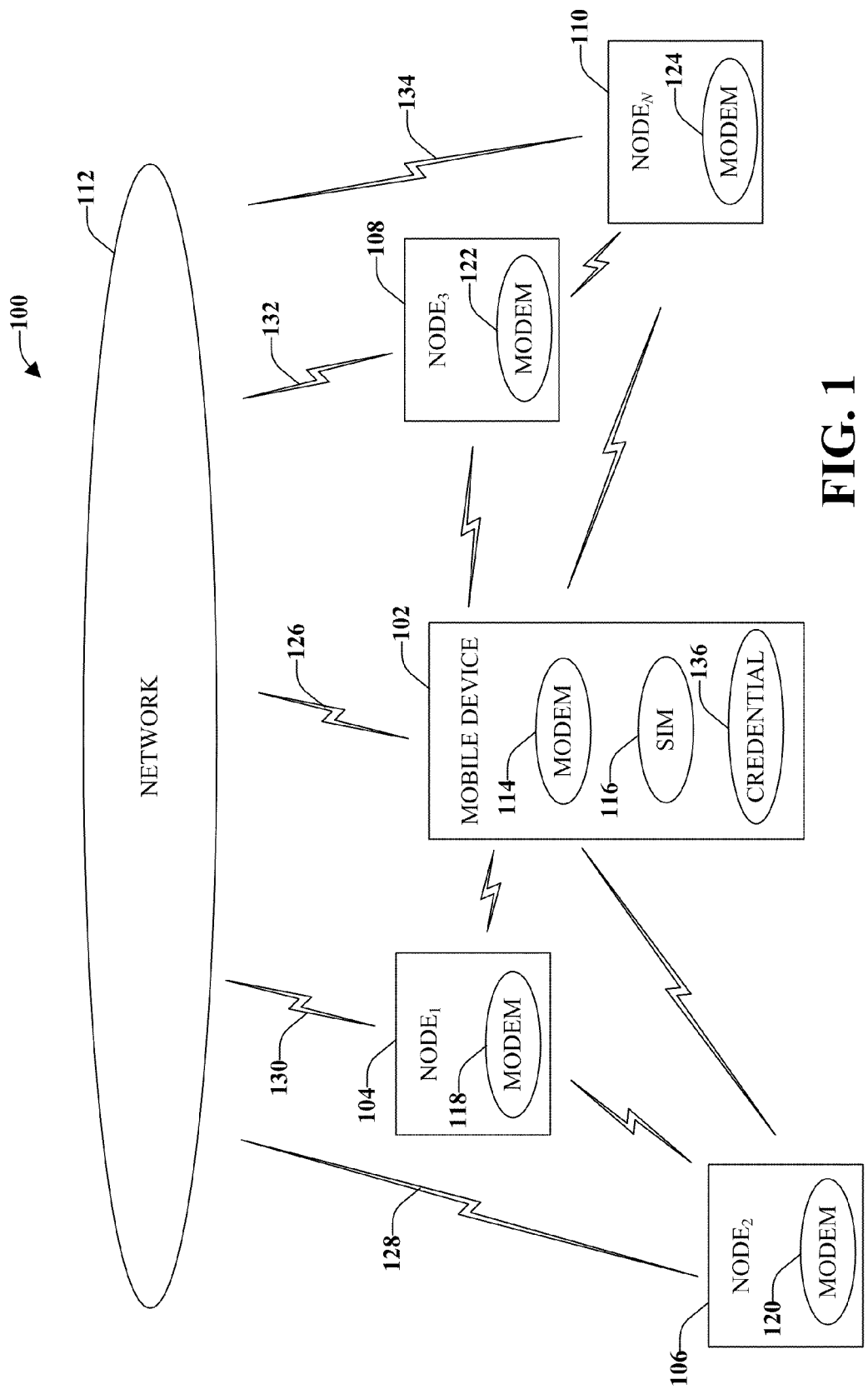
FIG. 1 illustrates an example system in which the disclosed aspects can be utilized.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing these aspects.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a mobile device. A mobile device can also be called, and may contain some or all of the functionality of a system, subscriber unit, subscriber station, mobile station, mobile, wireless terminal, node, device, remote station, remote terminal, access terminal, user terminal, terminal, wireless communication device, wireless communication apparatus, user agent, user device, or user equipment (UE), and the like. A mobile device can be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card and/or another processing device for communicating over a wireless system. Moreover, various aspects are described herein in connection with a base station. A base station may be utilized for communicating with wireless terminal(s) and can also be called, and may contain some or all of the functionality of, an access point, node, Node B, e-NodeB, e-NB, or some other network entity.

Various aspects or features will be presented in terms of systems that may include a number of devices, components, modules, and the like. It is to be understood and appreciated that the various systems may include additional devices, components, modules, and so forth, and/or may not include all of the devices, components, modules, and so on, discussed in connection with the figures. A combination of these approaches may also be used.

Additionally, in the subject description, the word "exemplary" (and variants thereof) is used to mean serving as an example, instance, or illustration. Any aspect or design described herein as "exemplary" is not necessarily to be construed as preferred or advantageous over other aspects or designs. Rather, use of the word exemplary is intended to present concepts in a concrete manner.

With reference now to FIG. 1, illustrated is an example system 100 in which the disclosed aspects can be utilized. A mobile device will attempt to locate a trusted communicator whenever possible and offload its WWAN communications to trusted communicator to the extent possible. This can be thought of as mobile device being in Bluetooth® sniff mode (for example) for most of the time. Further, system 100 can utilize a network assisted approach or a network unassisted approach for carrying out the various aspects.

Included in system 100 is a mobile device 102 and a multitude of other devices or nodes, illustrated as $node_1$ 104, $node_2$ 106, $node_3$, 108, through $node_N$ 110, where N is an integer. Nodes 104, 106, 108, 110 can be various types of communication devices (e.g., laptop computer, desktop computer, personal digital assistant (PDA), mobile phone, and so on) and/or modems (e.g., car modem, wall plug unit modem, and so forth). Nodes 104, 106, 108, 110 can be associated with mobile device 102 and can communicate with mobile device 102 and with a network 112, which can be which can be a Wireless Wide Area Network. For example, a single user or a group of users (e.g., family, friends, work group, and so on) may have multiple devices or modems (e.g., mobile device 102, nodes 104, 106, 108, 110) through which one or more users can interact with network 112. Mobile device 102 includes a wireless wide area network (WWAN) modem 114 and a Subscriber Identity Modem (SIM) Card 116. Each node 104, 106, 108, 110 includes a respective WWAN modem 118, 120, 122, 124.

Mobile device 102 and nodes 104, 106, 108, 110 are able to communicate with each other over peer-to-peer wireless links that may use a radio protocol (e.g., BlueTooth®, Ultra-Wide Band (UWB), Wireless Local Area Network (WLAN), Flash-LinQ®, and so forth) other than WWAN protocol used for WWAN connectivity. Usually, mobile device 102 communicates with network 112 over a direct link 126. However, in accordance with various aspects disclosed herein, mobile device 102 can utilize one of the nodes 104, 106, 108, 110 and utilize that node to communicate with network 112 over an indirect link 128, 130, 132, 134. When communicating with network 112 over either direct link 126 or indirect link 128, 130, 132, 134, mobile device 102 utilizes its own credentials 136.

Mobile device 102 can select a node 104, 106, 108, 110 to operate as a communicator as a function of whether an energy level consumption of mobile device 102 will be mitigated though usage of selected node 104, 106, 108, 110. This energy consumption mitigation can help increase battery life and other resources of mobile device 102. Thus, in some situations, it might be more beneficial for mobile device 102 to utilize an indirect link (e.g., through one of the nodes 104, 106, 108, 110) to communicate with network 112.

In accordance with some aspects, if mobile device 102 and nodes 104, 106, 108, 110 utilize the same protocol, choice of a node 104, 106, 108, 110 might be a function of whether indirect link 128, 130, 132, 134 is a stronger connection to network 112 than the connection over direct link 126 (e.g., as a function of link quality, as a function of a direct link quality, as a function of an indirect link quality). Nodes 104, 106, 108, 110 can be in various locations. For example, nodes 104, 106, 108, 110 can be in a car operating as a modem (integrated or after-market device), by a home desk (e.g., user's laptop, wall-plugged, and so forth), by a work desk (e.g., user's laptop, wall-plugged, and so on), carried by a user that is walking or at a meeting (e.g., user's laptop, wall-plugged, and so on), as well as in other locations.

In an example, in a car, antennas for communicating can be located outside the car and will not suffer penetration losses through the car. However, if mobile device 102 is inside the car, direct link 126 can suffer signal degradation since signals have to penetrate though the car. Thus, if one of the nodes 104, 106, 108, 110 includes antennas outside the car, it might be beneficial to use that node for communication since that node might have a better link and, therefore, can communicate faster to network 112 (or a base station) and use less resources and energy because of the faster communication.

Alternatively or additionally, choice of a node 104, 106, 108, 110 can be a function of a node energy level and an amount of energy that will be consumed by the node while communicating with network 112. In this aspect, if node energy level is low and/or would be drained due to the amount of energy that will be consumed, mobile device 102 might utilize a different node or might utilize direct link 126. Further information related to various aspects will be provided with reference to the following figures.

According to some aspects, proxy node (e.g., communicator) can handle the entire WWAN stack to conserve energy related to WWAN processing at mobile device 102. Communicator node can handle all WWAN connectivity, mobility, and network management. Additionally, communicator can respond and handle all circuit switched (CS) voice calls (e.g., does not involve mobile device 102 for CS voice calls). Communicator can transfer data traffic over short-range link with mobile device 102. Further, communicator can have the ability to handoff CS calls to mobile device.

In accordance with some aspects, mobile device 102 does not interact with WWAN network directly when within range of communicator (e.g., selected node). Further, mobile device 102 can remain idle for calls. Alternatively or additionally, if mobile device 102 has data connectivity, mobile device 102 might wake up occasionally to receive data over a short-range link with communicator.

Figure 2:
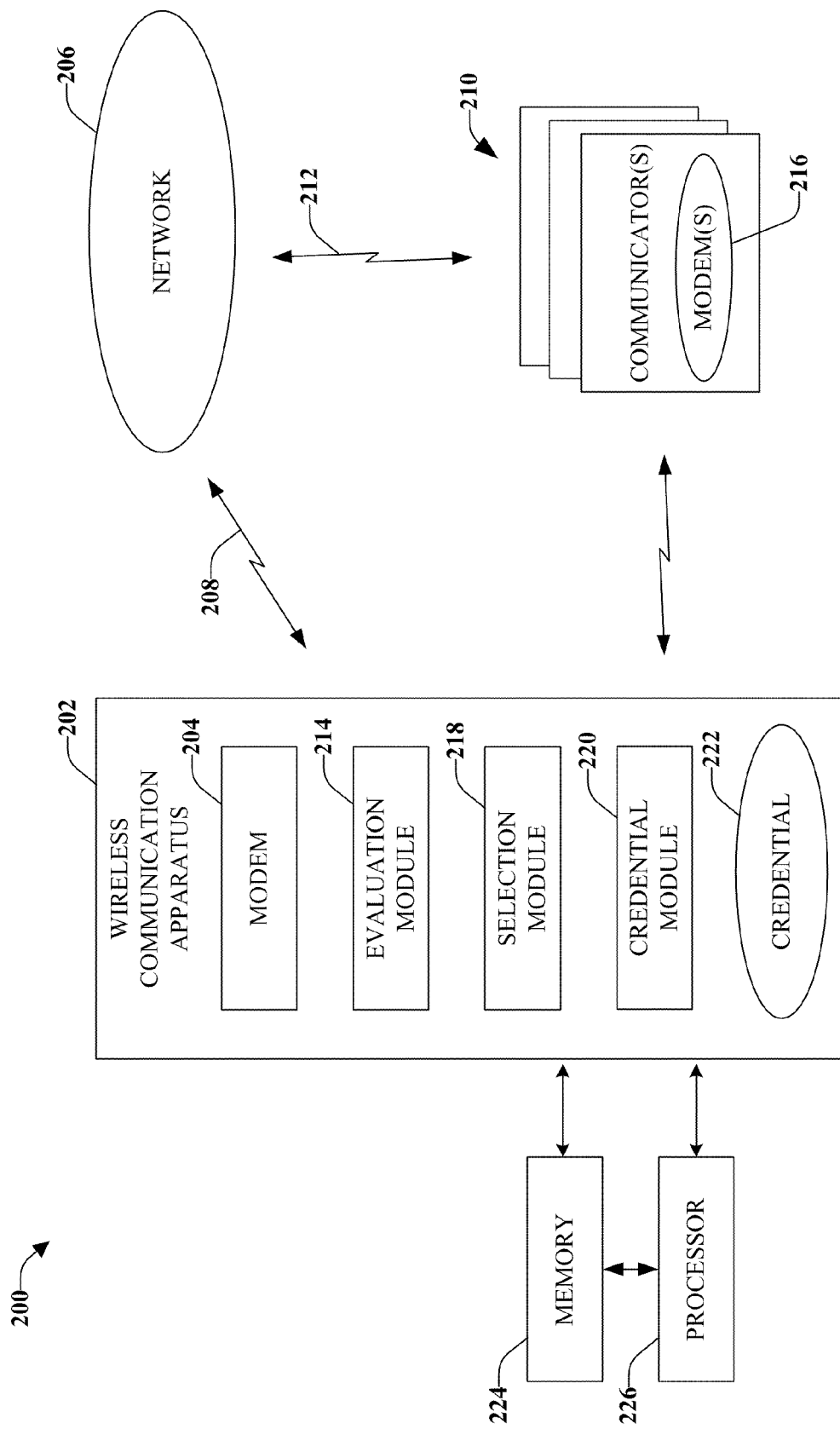
FIG. 2 illustrates a system for conserving energy though selection of a communicator, according to an aspect.

FIG. 2 illustrates a system 200 for conserving energy though selection of a communicator, according to an aspect. System 200 includes a wireless communications apparatus 202 that can be utilized with the disclosed aspects. Wireless communications apparatus 202 can be, for example, mobile device 102 of FIG. 1. Wireless communications apparatus 202 includes a modem 204, which can be a wireless wide area network (WWAN) modem. Wireless communications apparatus 202 can communicate directly with a network 206 (e.g., direct link 208) or through a variety of nodes or communicators 210 associated with (or discoverable by) wireless communications apparatus 202. Communicators 210 can communicate with network 206 over respective indirect links 212.

Also included in wireless communications apparatus 202 is an evaluation module 214 that is configured to assess an energy consumption level of wireless communications apparatus 202 and/or for each of the plurality of communicators 210, wherein each of the plurality of communicators 210 comprises a wireless wide area network modem 216. Assessment by evaluation module 214 can be performed based on computation of the energy consumption level by evaluation module 214 or based on receipt of an energy consumption level. For example, wireless communications apparatus 202 can calculate the energy consumption level for each of the plurality of communicators 210 and for wireless communications apparatus 202. However, in accordance with some aspects, each of the plurality of communicators 210 calculates its own energy consumption level and reports the level to wireless communications apparatus 202 and/or to other nodes.

Further, wireless communications apparatus 202 includes a selection module 218 that is configured to choose one of the plurality of communicators 210 as a wireless wide area network communicator. As a communicator, chosen node operates as an intermediary between wireless communications apparatus 202 and network 206. Selection of one of the plurality of communicators 210 can be a function of mitigation of an energy consumption level of wireless communications apparatus 202. However, in accordance with some aspects, it might be more energy efficient for wireless communications apparatus 202 to utilize its own WWAN modem 204 to communicate with network 206 (e.g., over direct link 208). In this case, direct link 208 with network 206 is established by wireless communications apparatus 202 and none of the communicators 210 are selected to operate as communicator.

According to some aspects, one (or more) of the plurality of communicators 210 might have more energy and a better link than wireless communications apparatus 202. In this case, wireless communications apparatus 202 might decide to utilize that node to communicate as opposed to using direct link 208 to communicate, although both wireless communications apparatus 202 and chosen node have a similar wireless modem. For example, wireless communications apparatus 202 has a modem 204, however, wireless communications apparatus 202 will not utilize that modem 204 but will use a node's modem 216 and connect to network 206 over indirect link 212 because more energy would be consumed by wireless communications apparatus 202 if its modem 204 were utilized to communicate. Thus, a multi-hop route can be utilized by wireless communications apparatus 202 to conserve energy while performing communication functions.

Also included in wireless communications apparatus 202 is a credential module 220 that is configured to utilize a credential 222 of wireless communications apparatus 202 to communicate with network 206 on both direct link 208 and indirect link 212. If over indirect link 212, credential module 220 conveys the identity of wireless communications apparatus 202 (e.g., credential 222) to selected node. Thus, if an indirect link is utilized, wireless communications apparatus 202 would bypass its own modem 204 and modem 216 of selected node would be utilized. In other aspects, selected node would use its own identity to obtain access to network 206. In some other aspects, identity of wireless communications apparatus 202 is utilized to obtain access to network 206 regardless of the modem 204, 216 utilized (e.g., direct link 208 and/or indirect link 212) and the selected node would utilize credential 222 of wireless communications apparatus 202 instead of its own identity. Thus, selected node would borrow the identity of wireless communications apparatus 202 to connect to network 206 and then allow wireless communications apparatus 202 to communicate with network 206 through selected node (e.g., selected node becomes a pass through node). Network 206 is not aware that it is communicating through selected node since selected node appears to network 206 to be wireless communications apparatus 202 (e.g., a network unassisted mode).

In an example, a user might be walking with a laptop (e.g., a communicator 210) and a cellular telephone (e.g., wireless communications apparatus 202) and using the laptop to communicate (e.g., cellular telephone is not communicating directly with network 206). If there is a communication for cellular telephone, cellular telephone can wake-up and perform communication functions. In an example, cellular telephone might be consuming 30 milliamps of current when it is actively communicating through laptop. However, if cellular telephone were communicating with network 206 directly, it might use 300 milliamps of current. An energy consumption calculation can take into account a current draw, an estimated usage time, and a voltage in order to obtain a total energy value. Thus, in this example, there is a difference factor of ten between using direct link 208 versus using indirect link 212 and, therefore, it is more energy efficient to utilize indirect link 212.

In accordance with some aspects, the determination whether to use direct link 208 or indirect link 212 can be a function of link quality. For example, direct link 208 can send data at a rate of one hundred kilobits per second and an indirect link can send data at a rate of one megabits per second. If there is one megabit to send, indirect link 212 can send the data in one second while direct link 208 will take ten seconds to send the data. The slower link (e.g., direct link 208) will take longer to communicate and can consume more energy. Therefore, the combination of link quality, which directly affects energy, and length of time required to communicate can be utilized to determine whether to use direct link 208 or indirect link 212 and, further, if indirect link 212 is utilized, the combination can be utilized to determine which node should be utilized for the communication.

According to some aspects, the determination can be made based on the amount of energy available for wireless communications apparatus 202 and the amount of energy available for each node (e.g., indirect link 212). By way of example and not limitation, a laptop can have a battery that is 90% charged and a car modem can have a battery that is fully car powered. In this case, wireless communications apparatus 202 might decide to use car modem to communicate since the battery drain of car modem will be minimal. In another example, laptop might have 20% of remaining battery power and wireless communications apparatus 202 is fully charged (e.g., battery level is around 100%). In this case, wireless communications apparatus 202 might decide to use direct link 208 since the laptop battery power level is lower than the battery power level of wireless communications apparatus 202.

According to some aspects, the determination can be made based on the battery power level and the amount of energy that is expected to be consumed for the communication. In accordance with this aspect, a resource function computation can be utilized to make the determination.

The following will provide an example resource function that can be utilized with the disclosed aspects, however, it should be understood that this is simply an example and other calculations and/or units can be utilized to determine whether to utilize direct link 208, indirect link 212, and/or which communicator 210 to utilize for indirect link 212. An example resource function can be:

$$R(z_d, z_u, x) = (E_d(z_d) + E_u(z_u))/K(x)$$

where, R→Resource Function, x is the energy level fraction, $z_d$ is desired client downlink bandwidth, $z_u$ is desired client uplink bandwidth (percentage of max device energy), $K(x)$ is an energy availability function based on the energy level, which is typically a non-decreasing function of x. In some aspects, $K(x)$ is a sigmoid function such as of the form $1/(1+e^{-\lambda(x-\delta)})$. In accordance with some aspects, $K(x)$ can be a step function, a series of step functions, or a linearly increasing function. For example, if $K(x)=x$, then when the fraction of battery capacity available, x, is 0.7, then $K(x)=0.7$, and when $x=0.3$, then $K(x)=0.3$. Instead, if $K(x)$ is sigmoidal in form, then it is possible that when $x=0.7$, $K(x)=0.97$, and when x=0.3, K(x)=0.03. For a fully powered device, K(x)=1. The energy-utilization functions can be written as:

$$E_d(z_d)=(\epsilon_d+\ominus_d z_d), E_u(z_u)=(\epsilon_u+\beta_u z_u)(\text{Linear})$$

$\epsilon_d$ and $\epsilon_u$ are energy costs of downlink and uplink processing respectively that is independent of the data rate. $\beta_d$ and $\beta_u$ are the energy costs per second for downlink and uplink processing respectively as a function of the data rate. Another example of a resource function computation could be of the form:

$$R(z_d,z_u,x,E\_\text{local})=(E_d(z_d)+E_u(z_u)+E\_\text{local})/K(x)$$

where E_local includes energy costs for additional local processing. Such local processing could include energy associated with tasks needing to be processed on the platform that relate to wireless communications for client (e.g. wireless communications apparatus 202) and other tasks that do not relate to wireless communication tasks associated with client. On the client, such energy is associated with additional tasks on the client platform (user of client platform may be utilizing client platform to play games, for example). On the communicator, such energy could be associated with tasks offloaded by client to communicator (such as client allowing a voice call to terminate on communicator and fully processed by communicator), or local tasks on communicator itself (for example, a user of the communicator platform may be browsing or playing games utilizing communicator, wherein such processing involves both computation and communication energy on the communicator platform).

In accordance with some aspects, in addition to offloading communication tasks, certain processing tasks may also be offloaded. In some aspects, for example, a voice call may terminate directly on communicator node, whereas information related to an Internet data session may be relayed by communicator node to client node (e.g., wireless communications apparatus 202). In additional aspects, communicator node may process some tasks related to network and offload such tasks on behalf of client node. Under such circumstances, the amount of data flowing over the peer to peer link is further reduced and the amount of time that client node needs to be awake may be further reduced, which can increase the amount of energy saved on client node. When tasks are offloaded, client node can sleep while communicator performs certain tasks and, the greater the offloading, the longer client node can sleep. Client node can wake up periodically or aperiodically as suggested by communicator or as determined by client node itself. For example, if client node and communicator node use BlueTooth® as the wireless protocol for their peer to peer link, then client node can be in a BlueTooth®-Sniff mode waking up occasionally to communicate with communicator. When client node sleeps, communicator can buffer information intended for client node and then communicator can deliver the data in a burst, if necessary, when client node wakes up for the next communication phase with communicator.

In some cases, offloaded tasks could include monitoring network for changes in network, such as obtaining information related to the signal-quality with base stations that are within range of communicator to consider for handoff of the ID of the cell that communicator is in. This is useful when client node and communicator node are in a mobile environment. An example is that of a phone in a car, where the car has an integrated car modem or a laptop on the seat. In this scenario, the phone is the client device and the car modem or the laptop can function as the communicator device. In such cases, communicator could provide updates to client node whenever communicator makes such measurements to keep client node up to date. Alternatively, communicator may provide such information to client node only when there is a significant change to previously supplied information or only when there is a need to discontinue providing the communicator service.

In accordance with some aspects, it is possible that client node and communicator use more than one peer to peer wireless link for their communications. For example, BlueTooth® may be used for wakeup whereas BlueTooth® or WirelessLAN or UWB or other protocols may be used for data delivery. In cases where certain additional processing is offloaded by client node to communicator, the E_local contribution to the resource function will have a small value when compute on client node and a large value when computed on communicator, if client node uses communicator for such processing.

In some aspects of offloaded processing, the offloaded tasks may terminate directly on communicator node (such as voice call or information related to a traffic alert). In other aspects of offloaded processing, the offloaded tasks may be processed on communicator (such as network related event processing) and the results of such processing may be communicated to client node over peer to peer link, between communicator and client node. In such cases, consideration should be given to the wireless communication delay over the peer to peer link for client node to receive such information and it should be verified that the delay is acceptable with regards to the desired completion time of the task on the platform.

Although energy (voltage*current*time) is measured in Joules or millijoules, each of the terms could be represented by the average current in mA (milliAmperes) consumed for each of the tasks, or in mAs (milliAmpereSeconds) when measuring the energy cost associated over a time window. When specifying energy in terms of mAs, the voltage consumed by the device is implicit and the energy is specified in terms of energy units per unit voltage. When specifying energy in terms of mA, it represents the energy per unit voltage per time.

In another example of a resource function computation, the denominator can be an energy level of the node being analyzed and the numerator can be the amount of energy (e.g., average energy consumed) expected to be consumed to perform communication functions. For example, if a phone communicates with network, it might consume 300 milliamp of current and when not communicating (e.g., in sleep mode), phone might consume much less energy (e.g., less than 10 milliamp). Phone can switch between lower power mode and higher power mode depending on whether it is communicating or not communicating. If phone will be actively communicating all the time, it is consuming 300 milliamp. Thus, 300 milliamp is placed in the numerator of the function and in the denominator is placed the amount of milliamp hours remaining in the battery.

An example of such a resource function computation on the communicator could be of the form:

$$R(z_d,z_u,W\_\text{avail},E\_\text{local})=(E_d(z_d)+E_u(z_u)+E\_\text{local})/W\_\text{avail}$$

where W_avail is the total available battery energy. W_avail could be represented in mAH (milliAmpereHours). In this case, W_avail=x*W, where x is the fraction of battery capacity available and W is the total battery capacity on the platform in mAH. The energy components in the numerator could be the average current in mA for each of the tasks. Whenever an average current for a task is not known prior to making a decision, an average current for a task is estimated by a platform to make the decision.

The reciprocal of the resource function can also be used for making comparisons. In accordance with other aspects, only the numerator of the resource function is used ignoring the available energy level on the platform. In general, the resource function computation considers the impact on each platform based on the computation and communications tasks and the current energy level on the platform to then determine the appropriate node to allocate tasks to. It is possible that a client node may prefer to use an indirect path through a communicator based on a comparison of the resource functions for the direct and indirect paths. However, the communicator may not want to provide the service based on a computation of its own resource function for providing the service. In such a case, client node is forced to select direct path and not use communicator, due to the non-availability of communicator.

For the indirect downlink path through the communicator, the energy utilization functions on communicator node include energy costs for processing and transporting downlink traffic using the WWAN link for reception and the peer to peer link for transmitting to client node (e.g., wireless communications apparatus 202). For the indirect uplink path through communicator, the peer to peer link is used for reception and the WWAN link is used for transmitting to network 206. The energy utilization functions on client node include the costs for transmission and reception and processing over the peer to peer link.

For the direct downlink and uplink paths, the energy utilization functions on client node include the costs for transmission and reception and processing over the direct WWAN link between the client and the network.

A client node compares the sum of the downlink and uplink energy utilization functions for the peer to peer link transmissions with the downlink and uplink energy utilization functions for the WWAN link transmissions to select whether to use direct link 208 or indirect link 212. Therefore, the client node compares the resource functions for the direct path $R_{direct, client}$ ($z_d$, $z_u$, W_avail, E_local) versus the resource function for the indirect path $R_{indirect, client}$ ($z_d$, $z_u$, W_avail, E_local) and can use the path for which the resource function has a lower value. Thus, client node may compare the resource function value for processing over the direct path, versus the resource function value for processing over the indirect path to select whether the direct path or the indirect path will be used for communications.

If client node determines that it is preferable to use indirect link 212, then the resource function on communicator should be lower than a specific threshold for communicator to consider it worthwhile to provide service. If the energy on communicator needs to be considered, then communicator node computes the resource energy function to determine whether it should support additional processing for client. When considering the performance of the WWAN links and the peer to peer links, the energy usage computation on communicator is subject to the constraints:

$$B_{k,d} > (1+\rho_w)z_d, B_{k,u} > (1+\rho_w)z_u$$

$$P_{k,j} > (1+\rho_p)(z_d+z_u)(k \neq j, \text{ where } j \text{ is the client})$$

where $B_{k,d}$→available downlink bandwidth from $k^{th}$ WWAN modem device (communicator), $B_{k,u}$→available uplink bandwidth from $k^{th}$ WWAN modem, $P_{k,j}$→available peer to peer link bandwidth between client (j) and $k^{th}$ WWAN modem device. In some aspects, where communicator node is fully powered, then its energy is not critical, and in such aspects, communicator node merely determines whether it can meet the bandwidth and delay constraints for performance.

In accordance with some aspects, it is possible that $B_{k,d}$ and $B_{k,u}$, as perceived by WWAN modem on communicator node, are higher than that perceived by WWAN modem on client node when communicator node may have better links to network, thereby utilizing less resources/time on the WWAN for communications, thereby benefitting the WWAN as well as when the communicator is used for the client's communication needs.

In an example, battery is fully charged and has 800 milliamp hours, and, over time the amount of power remaining drops to 400 milliamp hours. A calculation is to be performed and 400 milliamp hours is placed in the denominator, which is the amount of energy remaining and in the numerator is placed the amount of current being consumed (300 milliamp). The result reflects the fractional utilization of the energy in the system by executing tasks related to computation and communications. The reciprocal of the result is how long device can be used until the battery no longer has a charge (e.g., battery lifetime). It should be understood that this is merely an example and different units and calculations can be utilized with the disclosed aspects.

As stated above, the calculation can employ a sigmoid function since it is possible that for a certain type of service, wireless communications apparatus 202 may not be concerned with the energy level up to a certain point. For example, the remaining battery lifetime might not be a concern until the battery lifetime reaches fifty percent (e.g., if fully charged lifetime is 800 milliamp, then fifty percent of lifetime is 400 milliamp). In this case, the function might be transformed slightly differently. For example, 800 milliamp might be equal to "1" and 600 milliamp might be equal to "0.98" (on a "1" scale), however, 400 milliamp might be "0.5"

According to some aspects, wireless communications apparatus 202 is not concerned about the battery level of another node, as long as wireless communications apparatus 202 minimizes is own energy consumption, even if the battery of the communicator 210 is fully consumed (e.g., reduced to zero remaining power). In this aspect, wireless communications apparatus 202 compares the energy over direct link 208 versus indirect link 212 and utilizes indirect link 212 to conserve power.

In an aspect, communicator 210 can allow wireless communications apparatus 202 to sleep (e.g., conserve energy) when there is lack of information to be communicated to wireless communications apparatus 202 or when there is no information flow from communicator 210 to wireless communications apparatus 202 for a certain period of time. For example, wireless communications apparatus 202 can sleep or can be instructed, by communicator 210, to sleep when there is no information flow from communicator 210 to wireless communications apparatus 202 for a certain interval.

For delay tolerant applications, communicator 210 can buffer data, wake up wireless communications apparatus 202, and/or deliver data after a certain interval. This allows wireless communications apparatus 202 to sleep longer (e.g., communicator 210 does not need to wake up wireless communications apparatus 202 immediately), which can conserve energy and other resources. In this case, communicator 210 can determine how it will deliver data to wireless communications apparatus 202. Alternatively, wireless communications apparatus 202 can configure communicator 210 regarding delays that can be tolerated by wireless communications apparatus 202. For example, different applications can have different tolerable delays.

If there are multiple wireless links available between communicator 210 and wireless communications apparatus 202, either communicator 210 or wireless communications apparatus 202 (or both communicator 210 and wireless communications apparatus 202 jointly) can select a most energy efficient subset of wireless modems needed for communication. This most energy efficient subset of modems should meet any latency, bandwidth, jitter, and other constraints for delivery of information.

In accordance with some aspects, an entity in wireless wide area network assigns physical channels or radio bearers belonging to communicator 210 for use on behalf of wireless communications apparatus 202. Additionally or alternatively, an entity in wireless wide area network assigns logical channels or radio bearers belonging to communicator 210 for use on behalf of wireless communications apparatus 202. In current WWAN standards (such as UMTS), the term Transport Channel Switching is used to describe the process of switching between a dedicated transport channel using dedicated bearers (DCH (dedicated channel)-mode) for a wireless communications apparatus versus using a shared common channel (FACH—(forward access channel) mode). In accordance with the disclosed aspects, two processes, referred to as Transport Channel Expansion and Transport Channel Selection are based on the availability of nearby shared WWAN modems 210 for wireless communications apparatus 202. If a communicator 210 is available, then the set of available bearers for wireless communications apparatus 202 can be expanded to include bearers associated with communicator 210 and this process is referred to as Transport Channel Expansion. The process of selecting the bearers that should be used on behalf of wireless communications apparatus 202 from the set of available bearers is referred to as Transport Channel Selection.

According to some aspects, where the energy of communicator node is also important, tasks can be partitioned between client node and communicator node proportional to their relative energy levels. In such aspects, if $\Delta E_1$ is the amount of energy consumed on client and $\Delta E_2$ is the amount of energy consumed on the communicator, and $E_1$ and $E_2$ are the energy levels of client node and communicator respectively, then the tasks between client node and communicator can be partitioned such that the ratio is $\Delta E_1/E_1 = \Delta E_2/E_2$.

In accordance with some aspects, the energy of client node may be more important than the energy on communicator. In such aspects, the energy levels have different values of importance. For example, communicator may be charged more often than client in which case every Joule of the client's energy assumes higher energy priority value $\gamma_1$ relative to every Joule of communicator's energy with an energy priority value $\gamma_2$. In such cases, tasks can be partitioned such that the equation with the ratios $\Delta E_1/(\gamma_1 * E_1) = \Delta E_2/(\gamma_2 * E_2)$ is satisfied. To generalize this further, if there are N shared WWAN modems, then the tasks are partitioned such that:

$$\Delta E_1/(\gamma_1 * E_1) = \Delta E_2/(\gamma_2 * E_2) = \ldots = \Delta E_i/(\gamma_i * E_i) = \ldots = \Delta E_N/(\gamma_N * E_N)$$

In some aspects, $\gamma_1 = \gamma_2 = \ldots = \gamma_N$, so that the tasks are partitioned such that:

$$\Delta E_1/E_1 = \Delta E_2/E_2 = \ldots = \Delta E_i/E_i \ldots = \Delta E_N/E_N$$

In a more general aspect, the tasks are partitioned such that:

$$\Delta E_1/(\gamma_1 * f_1(E_1)) = \Delta E_2/(\gamma_2 * f_2(E_2)) = \ldots = \Delta E_N/(\gamma_N * f_N(E_N))$$

Here, the functions $f_i(E_i)$ could be the same for all nodes, or in other words, $f_i(E_i) = f(E_i)$ where the same function f is used for each node. Alternatively, a node could have its own $f_i(E_i)$ function that is different from the function used on other nodes. An example of the form of $f_i(E_i)$ could be $f_i(E_i) = E_i$. Alternatively, consider $x_i = E_i/E_{max,i}$ = fraction of energy availability on node i, where $E_{max,i}$ is the maximum capacity of energy on node i (such as the capacity of the battery on node i). One could then consider using $f_i(E_i) = K(E_i/E_{max,i}) = K(x_i)$ where $K(x_i)$ is a sigmoid function of x as described earlier. Alternatively, $f_i(E_i)$ could be a linear function of $x_i$.

For all equations related to the energy ratios mentioned above, when such ratios cannot be exactly satisfied, the tasks are partitioned such that the ratios are satisfied as clearly as possible. In some aspects, certain tasks may have to be executed on specific nodes based on other constraints such as delay or wireless link performance, which may necessitate a non-equitable ratio partitioning of tasks. For example, tasks associated with acknowledgements at the RLC layer for wireless transmissions from a base station may have to be performed on a communicator, to meet the delay requirements for the reception of such acknowledgements at the base station, so that such tasks cannot be processed on the client that is using the communicator.

In some aspects for task partitioning, a path is chosen such that an overall global system energy/bit function across all components is minimized, or by optimizing with respect to an overall global system utility function that includes the energy costs for each component along a path, the required data rates, wireless link performance along each link in a path, and the delay constraints along a path. In some aspects for task partitioning, the overall system energy in using the direct and indirect paths can be considered to determine whether to use the direct path or an indirect path. A comparison can be made between the effective energy/bit consumed on the indirect path with the effective energy/bit consumed on the direct path. This comparison can be utilized to determine a path to select with the lower energy/bit. The indirect path can be chosen if:

Energy/bit(Indirect Path) < Energy/bit(Direct Path)

otherwise, the direct patch can be chosen.

This criterion can be applied from the perspective of the client, in which case the client selects the wireless interface (WWAN or Peer to Peer) over which to receive the data, depending on which interface results in lower energy consumption on the client. Alternatively, this criterion can be applied from the perspective of both the client and the communicator so that the total energy consumed along the path is minimized, including energy consumed at both the client and the communicator.

For example, it is possible that the WWAN link between the base station and the communicator may be significantly better than the WWAN link between the base station and the client. This is possible, for example, when the communicator is the car WWAN modem and the client is a phone in the car. The direct WWAN link between the base station and the phone's WWAN modem may be of poor quality due to propagation losses through the car and based on the location of the phone in the car. However, a car WWAN modem may have antennas external to the car and, therefore, have a better link with the base station so that better modulation and coding schemes can be used with more bits transmitted per symbol. The peer to peer link between the car modem system and the phone would be in the car so that the peer to peer link also has good quality. Under such conditions, the effective energy/bit cost along the indirect path may be lesser than the effective energy/bit cost along the direct path so that the indirect path is more energy efficient while considering energies consumed for all system components including the client, the communicator, and the base station. In such aspects, the indirect path saves energy not only with respect to the client, but also with respect to all components in the system.

System 200 can include memory 224 operatively coupled to wireless communications apparatus 202. Memory 224 can be external to wireless communications apparatus 202 or can reside within wireless communications apparatus 202. Memory 224 can retain instructions related to determining if an energy level of wireless communications apparatus 202 is mitigated by usage of a communicator selected from a plurality of communicators 210 and selecting the communicator. Memory 224 can retain further instructions related to supplying a credential of wireless communications apparatus 202 to communicator and communicating with wireless wide area network 206 through a modem of communicator with credentials 222 of wireless communications apparatus 202.

In accordance with some aspects, memory 224 retains further instructions related to utilizing a direct link 208 to communicate with wireless wide area network 206 if energy consumption level of wireless communications apparatus 202 is lower than an energy consumption level for the plurality of communicators 210. According to another aspect, memory 224 retains further instructions related to evaluating a quality of a direct link 208 and qualities of indirect links 212 associated with each of the plurality of communicators 210. Memory 224 also retains instructions related to utilizing direct link 208 if quality of direct link 208 is better than qualities of indirect links 212 associated with each of the plurality of communicators 210.

In another aspect, memory 224 retains further instructions related to evaluating a quality of direct link 208 and qualities of indirect links 212 associated with each of the plurality of communicators 210. Memory 224 also retains instructions related to utilizing one indirect link from indirect links 212 associated with each of the plurality of communicators if quality of at least one indirect link is better that quality of direct link 208.

Alternatively or additionally, memory 224 retains further instructions related to measuring an energy consumption level for each of the plurality of communicators 210. In accordance with some aspects, memory 224 retains further instructions related to bypassing a wireless wide area network modem 204 of wireless communications apparatus 202 to enable a communication though communicator selected. According to another aspect, memory 224 retains further instructions related to determining an energy level of each of the plurality of communicators 210 and estimating an amount of energy expected to be consumed by each of the plurality of communicators 210. Memory 224 also retains instructions related to selecting the one communicator from the plurality of communicators 210 as a function of the energy level and the amount of energy expected to be consumed.

Further, memory 224 can retain instructions and other suitable information related to signals transmitted and received in a communication network. Memory 224 can store protocols associated with selection of a WWAN communicator, taking action to control communication between wireless communications apparatus 202 and communicators 210, etc., such that system 200 can employ stored protocols and/or algorithms to achieve improved communications in a wireless network as described herein.

In accordance with some aspects, memory 224 retains further instructions related to receiving packets from wireless wide area network over a direct link and determining a best estimate of received packets. The determination can be based on reception of a first set of packets along direct link and based on receipt of a second set of packets over an indirect link through communicator and another node that receives a third set of packets from wireless wide area network.

According to another aspect, memory 224 retains further instructions related to choosing to receive a first set of packets from, but not transmit packets to, wireless wide area network over a direct link, receiving the first set of packets over direct link, and determining a best estimate of a set of received packets based on reception of the first set of packets along the direct link and a second set of packets along an indirect link.

At least one processor 226 can be operatively connected to wireless communications apparatus 202 (and/or memory 224) to facilitate analysis of information related to selection of shared wireless wide area network modems in a communication network. Processor 226 can be a processor dedicated to analyzing and/or generating information received by wireless communications apparatus 202, a processor that controls one or more components of system 200, and/or a processor that both analyzes and generates information received by wireless communications apparatus 202 and controls one or more components of system 200.

In accordance with some aspects, processor 226 is configured to select a wireless wide area network communicator. Processor 226 can include a first module for evaluating whether an energy level is mitigated by usage of a communicator selected from a plurality of communicators 210. Processor 226 can also include a second module for selecting the communicator and a third module for supplying a credential 222 to the communicator. Further, processor 226 can include a fourth module for communicating with a wireless wide area network 206 through a modem of the communicator with the credentials 222 of wireless communications apparatus 202.

In accordance with some aspects, communicators 210 can have respective memories and processors. For example, a communicator can have a memory that retains instructions related to receiving packets from wireless wide area network 206, wherein the packets are intended for a client device (e.g. wireless communications apparatus 202). Memory can retain further instructions related to conveying the packets from wireless wide area network 206 to client device, wherein communicator was selected by client device to mitigate resource consumption at client device.

According to some aspects, at least one of the non-selected communicators 210 can be utilized to facilitate providing complete data to wireless communications apparatus 202. Memory retains further instructions related to determining a best estimate of received packets based on reception of the packets from wireless wide area network, based on reception of packets by a shared node that receives from, but does not transmit to, wireless wide area network (e.g., non-selected communicator), and based on packets received by client device.

According to some aspects, memory retains further instructions related to determining a best estimate of received packets based on reception of the packets from wireless wide area network and based on reception of packets by a shared node that receives from, but does not transmit to, wireless wide area network.

In accordance with another aspect, memory retains further instructions related to transmitting packets to wireless wide area network on behalf of client device and determining a best estimate of received packets based on reception of the packets at communicator and based on reception of packets at client device.

In another aspect, memory retains further instructions related to determining a best estimate of received packets. The determination can be based on reception of a first set of packets at communicator, based on reception of a second set of packets at a shared node that receives from, but does not transmit to, wireless wide area network, and based on a third set of packets received by client device. Client device does not transmit a fourth set of packets directly to wireless wide area network.

In accordance with some aspects, the set of instructions for selectively conveying first set of packets from wireless wide area network to client device further terminates a subset of client applications locally or forwards first set of packets to another device that accepts first set of packets for client device. Additionally or alternatively, memory retains further instructions related to selecting a most energy efficient subset of wireless modems for communication. The most energy efficient subset of wireless modems meets at least one parameter for delivery of information and wherein there are a plurality of wireless modems available between node and client device.

In accordance with a further aspect, memory retains further instructions related to receiving physical channels or radio bearers assigned to communicator for use on behalf of client device or related to receiving logical channels or radio bearers assigned to communicator for use on behalf of client device.

Figure 3:
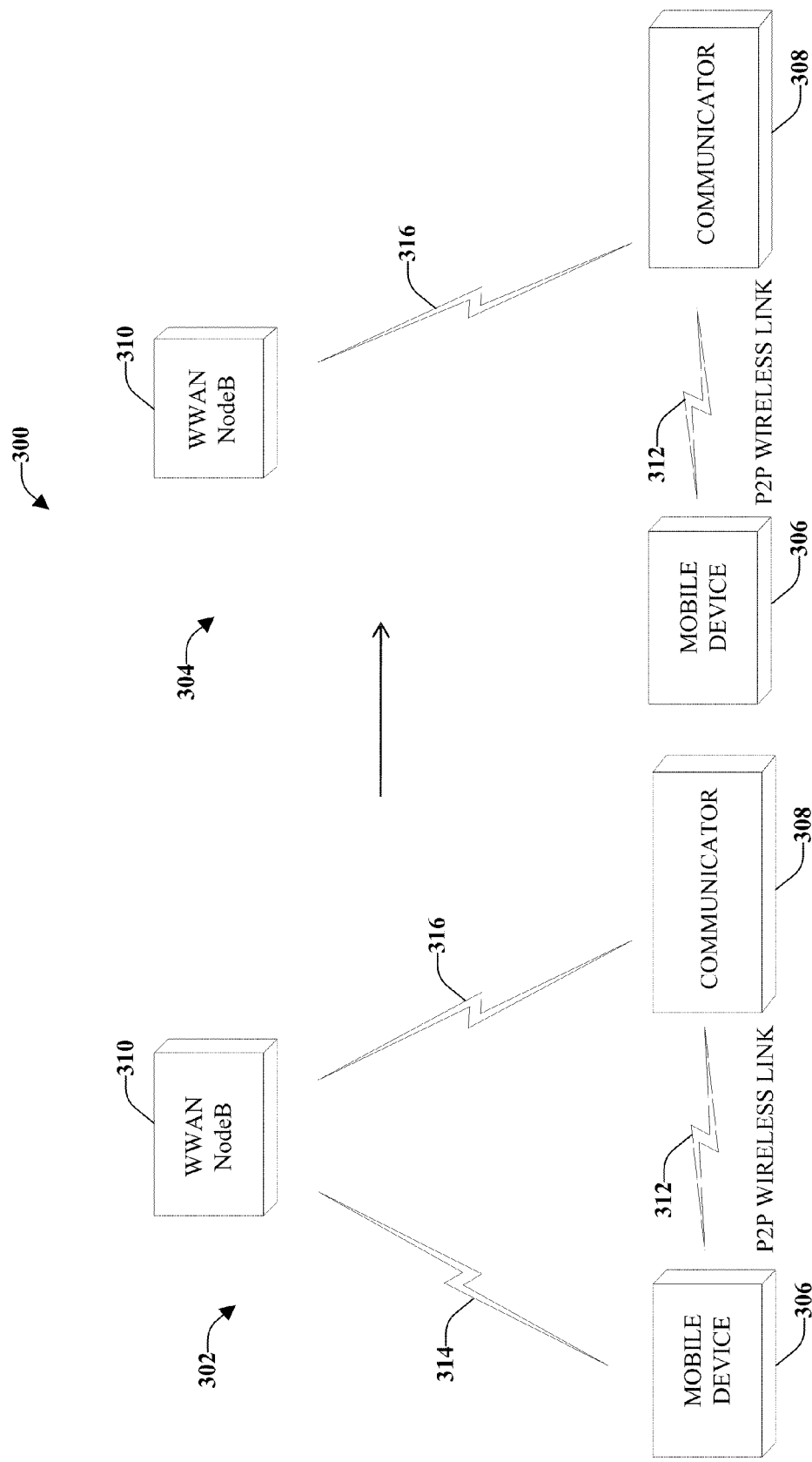
FIG. 3 illustrates an example architecture that can be utilized with the disclosed aspects.

FIG. 3 illustrates an example architecture 300 that can be utilized with the disclosed aspects. Illustrated are an existing configuration 302 and a configuration 304 utilizing various aspects disclosed herein. Mobile device 306 and communicator 308 (e.g., node selected) are configured to communicate over a peer-to-peer wireless link 312 (P2P wireless link), such as Bluetooth® or another short-range or long-range, wireless communication technique. Further, mobile device 306 communicates with a base station, such as a WWAN NodeB 310, over a WWAN direct link 314 and communicator 308 communicates with WWAN NodeB 310 over a WWAN communicator link 316 (e.g., indirect link). Mobile device 306 and communicator 308 have their own identities (e.g., SIM cards) and are able to connect to network (e.g., WWAN NodeB 310) independently.

Mobile device 306 and communicator 308 (or another node that can be utilized for indirect link) can find each other through a discovery process, wherein mobile device 306 and communicator 308 establish trust locally. The following is an example of how a mobile device 306 and communicator 308 discover each other over a short range peer-to-peer wireless link, such as Bluetooth®. It should be understood that the following is for example purposes only and other discovery techniques can be utilized with the disclosed aspects. Mobile device 306 comes within wireless proximity of communicator 308, which is broadcasting its capability (e.g., Bluetooth® capability). Mobile device 306 discovers communicator capability and requests credentials (e.g., WWAN certificate) and capabilities (e.g., bandwidth supported) of communicator 308. Communicator 308 responds with its credentials and capabilities. Next, mobile device 306 requests communicator 308 for service and provides credentials (e.g., a WWAN certificate) and communication requirement (e.g., required bandwidth). Communicator 308 verifies mobile device 306 credentials and informs mobile device 306 as to service approval (or disapproval). Mobile device 306 can respond with receipt of approval. Thus, mobile device 306 and communicator 308 do not need to go through network (e.g., WWAN NodeB 310), but can discover each other and once discovery is complete, can determine whether there will be two different identities to communicate with network (e.g., WWAN NodeB 310) of if only one identity will be utilized. In accordance with some aspects, credentials verification process may optionally involve interaction with WWAN and authentication servers.

In accordance with some aspects, mobile device 306 chooses to use any one of a multitude of WWAN modems depending on an energy level in nodes associated with the WWAN modems. A link performance indicator for each of the nodes might also be utilized to chose among nodes. A resource utilization function can be computed for each of the nodes. Based on the result of the resource utilization function, an appropriate modem is selected as the WWAN modem for communication. In the WWAN communicator mode, services are associated with the end-point, namely mobile device 306. Communicator 308 (e.g., proxy node) transports bits between NodeB/ENodeB (e.g., WWAN NodeB 310) with SIM card and associated services associated with mobile device 306. Depending on whether mobile device 306 or communicator 308 has higher energy, either of them could communicate with WWAN NodeB 310. However, only one communicates with base station (e.g., WWAN NodeB 310) since there is only one identity that is used for application data services being supported in WWAN communicator mode. When communicator 308 proxy node serves as WWAN communicator, mobile device 306 can reduce its energy requirements on its platform with regards to WWAN transmit and receive requirements. Communications for mobile device over short range wireless link can be less energy consuming compared with direct communications between mobile device 306 and WWAN base station (e.g., WWAN NodeB 310 or NodeB/ENodeB)

Figure 4:
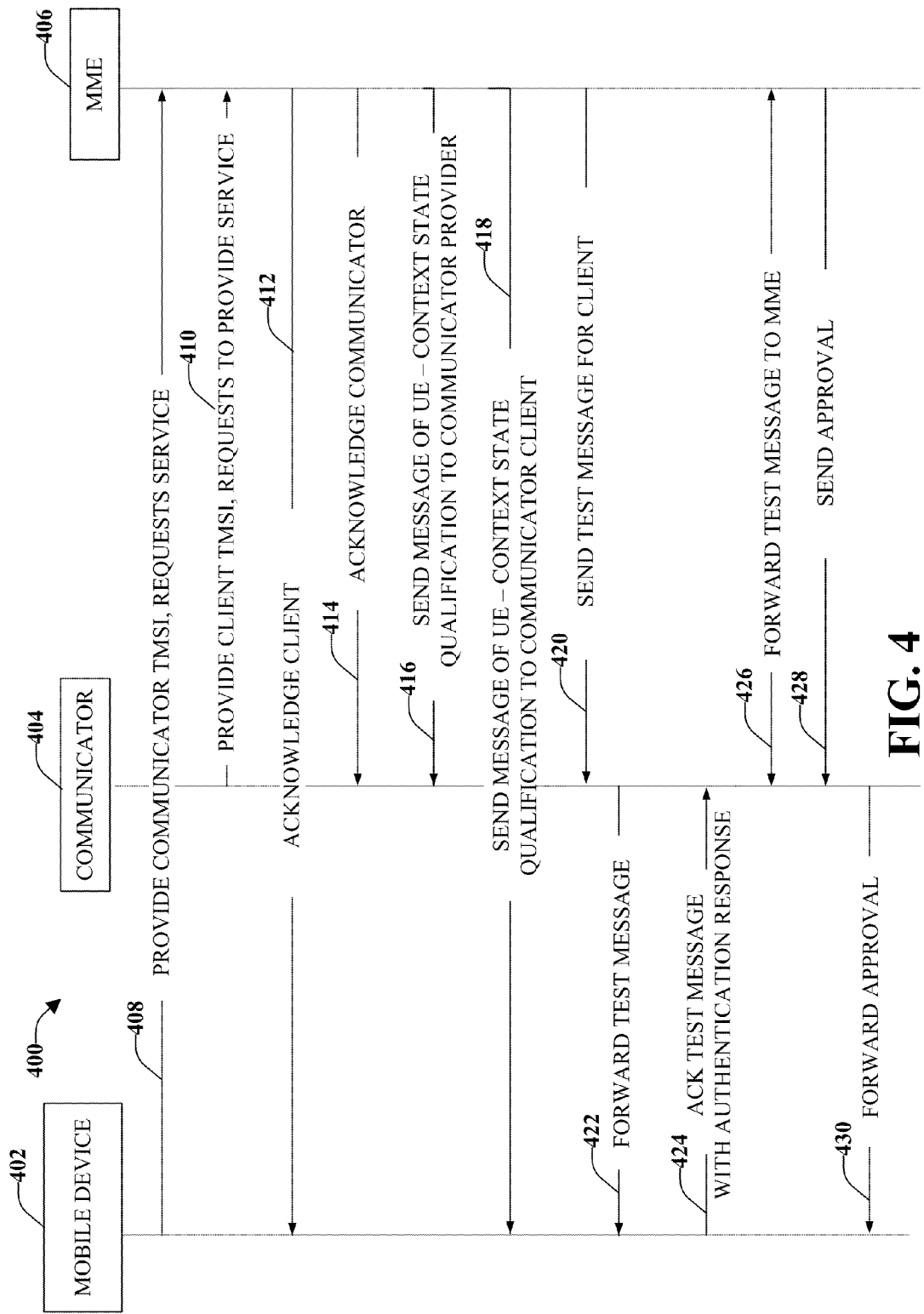
FIG. 4 illustrates an example call flow diagram that can be utilized with the disclosed aspects.

FIG. 4 illustrates an example call flow diagram 400 that can be utilized with the disclosed aspects. A mobile device 402 and a communicator 404 can exchange their Temporary Mobile Subscription Identifiers (TMSIs) over a peer-to-peer link. Mobile device 402 can utilize communicator 404 to communicate with a mobile management entity (MME) 406. At 408, mobile device 402 sends to network (e.g., MME 406), communicator's TMSI and requests utilization of communicator service. At 410, communicator 404 provides MME 406 with mobile device's TMSI and sends a request to provide communicator service for mobile device 402. MME 406 acknowledges mobile device 402, at 412, and acknowledges communicator 404, at 414. At 416, MME 406 sends message of UE (user equipment)-context state qualification to CommunicatorProvider. MME 406 can create a UE context when client powers on and attaches itself to network. Context can include temporary mobile subscription identifiers (TMSI) that is assigned by network to mobile device. Context can also include subscription information from Home Subscriber Server (HSS). A message is sent from MME 406 of UE-context state qualifications to CommunicatorClient, at 418.

According to some aspects, MME 406 can include Communicator TMSI into ClientUE-Context and can include Client TMSI into CommunicatorUE-Context. MME 406 can qualify state of CommunicatorUE-Context to CommunicatorProvider state. Further, MME 406 can qualify state of ClientUE-Context to Communicator Client state.

At 420, MME 406 sends test message for mobile device 402, which is received by communicator 404. Test message is forwarded from communicator 404 (and its bearers) to mobile device 402, at 422. Communicator 404 can encapsulate an authentication request to the Client SIM. Mobile device 402 acknowledges test message, at 424, with an authentication response, which indicates that indirect path is operating correctly. Communicator 404 forwards test message to MME 406, at 426. MME 406 sends approval, at 428, which is forwarded to mobile device 402, at 430. At this point, direct path (Client bearers) is torn down and indirect path is utilized for communication with mobile device 402. Mobile device 402 can shut down its WWAN radio and utilize peer-to-peer link for WWAN communication through communicator 404.

According to some aspects, MME 406 subsequently provides support for bearer establishment, client capabilities, dynamic list of bearers, tracking area updates, release, and propagation of client information in the access network.

To disable communicator mode, mobile device 402 can send a disable request to MME 406 through communicator 404. MME 406 can reestablish bearers for mobile device 402. MME 406 removes CommunicatorProvider qualified state from CommunicatorUE-Context. MME 406 also removes CommunicatorClient qualified state from ClientUE-Context.

Figure 5:
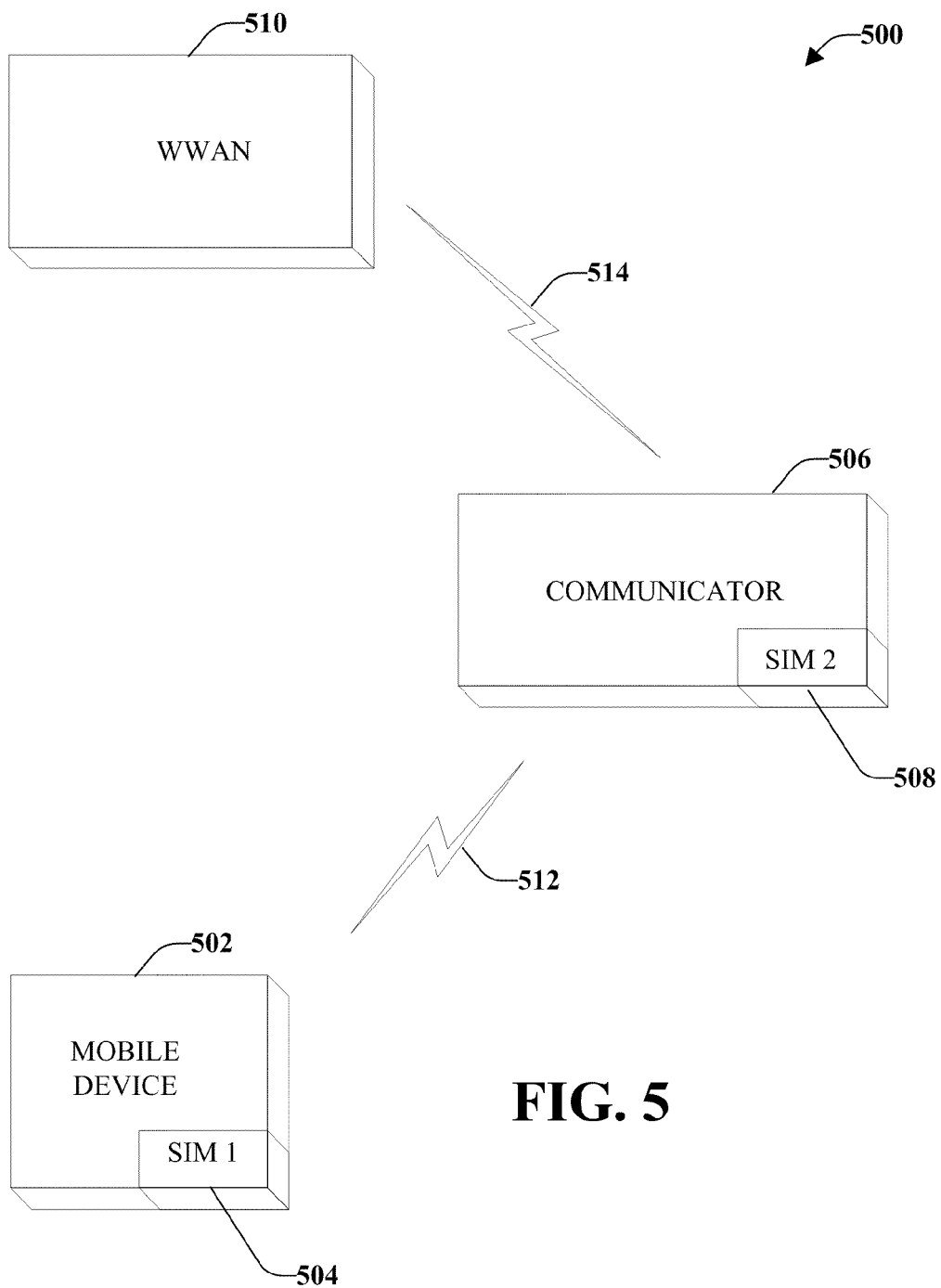
FIG. 5 illustrates an example system that utilizes a network-assisted communicator, according to an aspect.

FIG. 5 illustrates an example system 500 that utilizes a network-assisted communicator, according to an aspect. There are at least two variations that can be utilized with the disclosed aspects. These variations are a network assisted approach and a network unassisted approach. In network unassisted approach, network does not know which device is actually communicating with network. Network simply obtains identity of wireless communications apparatus and believes it is wireless communications apparatus with which network is communicating (when in fact it might be one of a plurality of nodes).

A network assisted approach can be similar to an access point approach, wherein access point has its own credential. In this case, wireless communications apparatus is using another modem (e.g., modem of one of the plurality of nodes) and that modem is using its own identity to obtain access to network.

Included in system 500 is a mobile device 502 that has a SIM, labeled SIM 1 504. Mobile device 502 utilizes a communicator 506, which includes a SIM, labeled SIM 2 508, to communicate with a network, labeled WWAN 510. Mobile device 502 and communicator 506 convey data over a peer-to-peer wireless link 512 and communicator 506 and WWAN 510 convey data over a WWAN link, 514.

In a conventional system, a Network Address Translation (NAT) must be performed wherein a node that is relaying traffic for another node has to change an Internet Protocol (IP) address and a port number in order for traffic to be routed correctly. For example, a first node (e.g., mobile device 502) will transmit information to a second node (e.g., communicator 506), wherein the information includes an IP number associated with first node and port number associated with first node. Second node will remove IP number and port number and replace it with a different IP number and port number. When information is received by second node addressed to the different IP number and port number, second node replaces the different IP number and port number with IP number and port number of first node and sends data traffic to first node.

In accordance with one or more of the disclosed aspects, the IP address does not have to change. Instead, communicator 506 simply utilizes its communication link and all traffic received by communicator 506 is sent to mobile device 502. Thus, since communicator 506 is a dedicated communicator for mobile device 502, NAT does not need to be performed, mitigating the amount of complexity involved.

Figure 6:
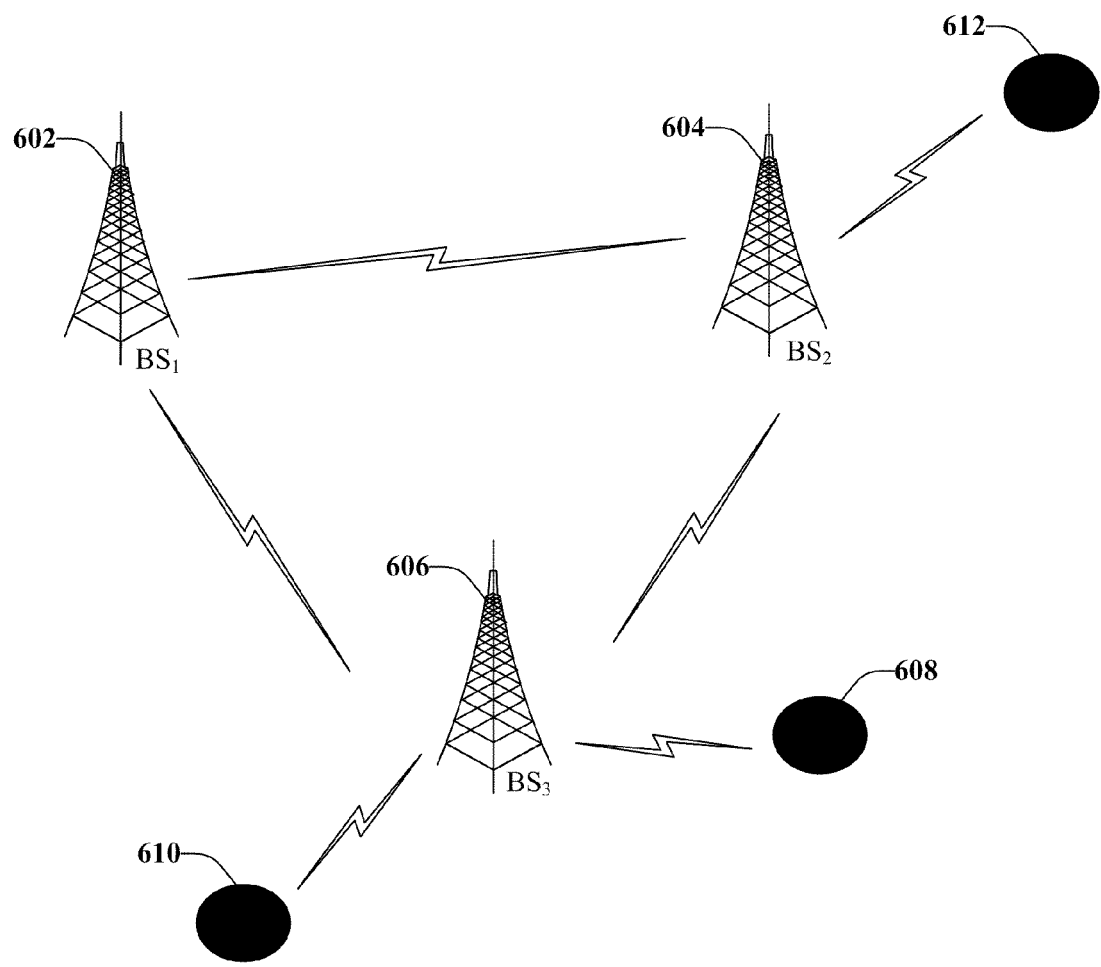
FIG. 6 illustrates a wireless communications network that utilizes a network assisted approach to allow devices to discover each other.

FIG. 6 illustrates a wireless communications network 600 that utilizes a network assisted approach to allow nodes to discover each other. Wireless communications network 600 can include multiple base stations (BS), labeled as $BS_1$ 602, $BS_2$ 604, and $BS_3$ 606. Also included in wireless communications network 600 are multiple nodes 608, 610, and 612 (e.g., mobile devices, communicators, and so forth). It should be understood that more than three base stations and more than three nodes can be included in wireless communications network 600.

As illustrated, node 608 and node 610 are in communication with $BS_3$ 606 and node 612 is in communication with $BS_2$ 604. Network 600 is aware of nodes 608, 610 (e.g., nodes 608, 610 are registered with the network). Further, network 600 is aware that nodes 608, 610 are communicating with the same base station (e.g., $BS_3$ 606). Thus, these two nodes 608, 610 are within range of each other but might not be aware of the existence of each other. In this case, network 600 can provide assistance so that nodes 608, 610 can discover each other. For example, $BS_3$ 606 can notify each node 608, 610 of the presence of the other node 608, 610. Based on this notification the nodes 608, 610 can discover each other. In accordance with some aspects, one or both of the nodes 608, 610 might have their radio turned off (e.g., BlueTooth® radio). In this case, $BS_3$ 606 might ask each node 608, 610 to turn on (e.g., activate) its radio in order to discover other nodes in network 600.

Figure 7:
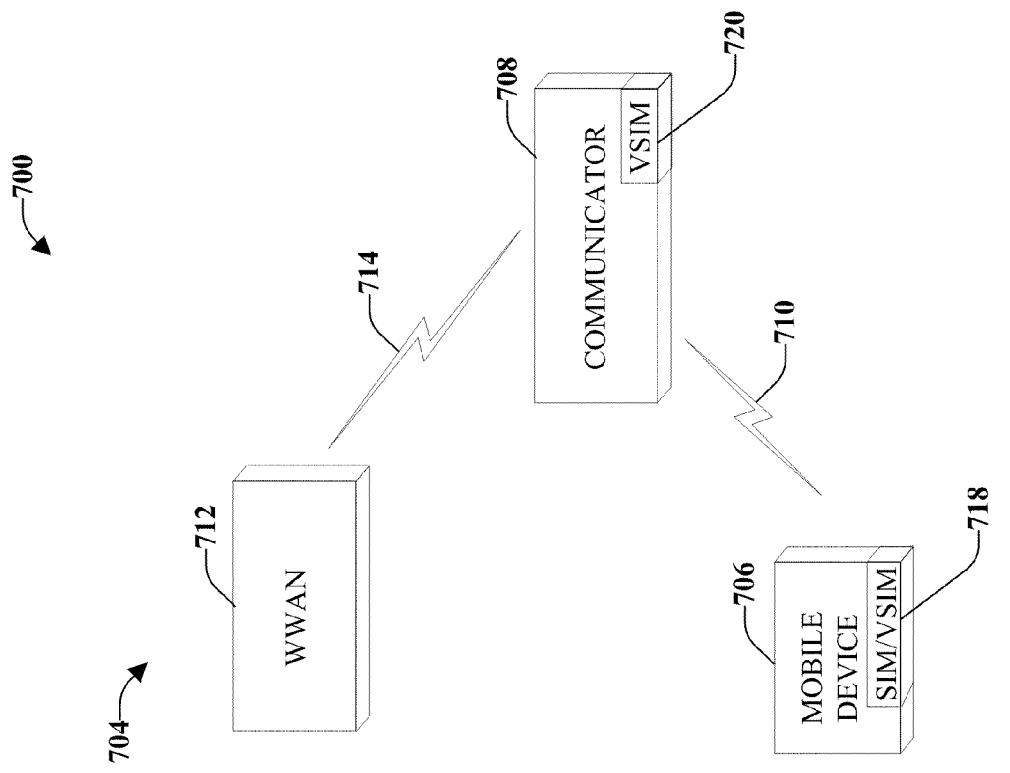
FIG. 7 illustrates an example system that utilizes a network-unassisted communicator, according to an aspect.
Figure 7:
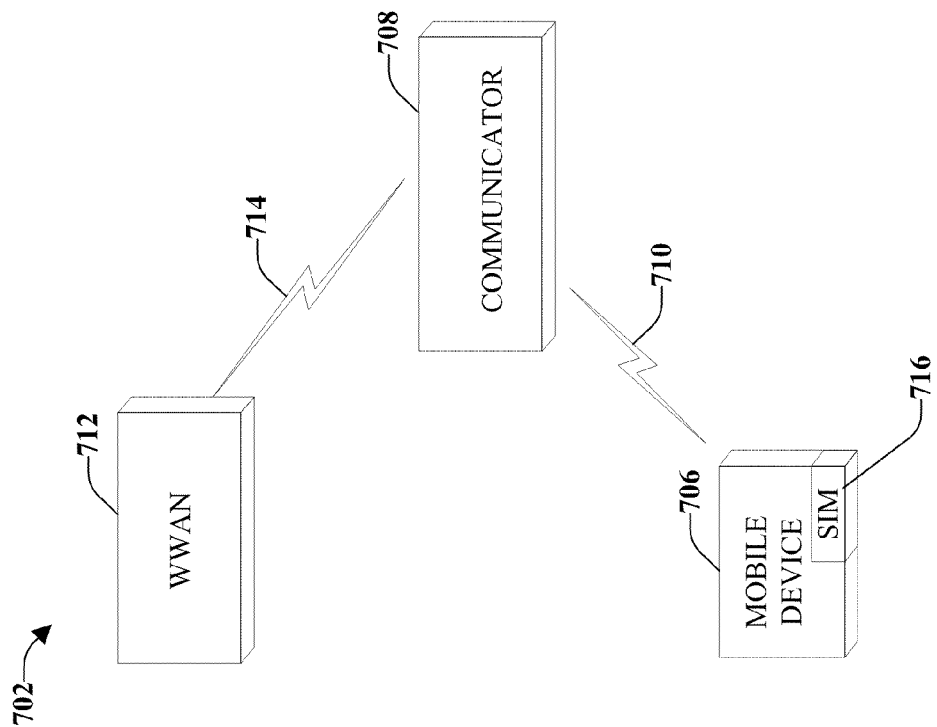

FIG. 7 illustrates an example system 700 that utilizes a network-unassisted communicator, according to an aspect, wherein network is not aware (nor does network care) with which node it is communicating since all nodes share a single credential. The following will provide an example of a network unassisted mode, a user might purchase a cellular telephone and supplemental devices (e.g., wall-mounted modem, car modem, laptop interface, and so forth). Cellular telephone and supplemental devices might have a single SIM card (e.g., on cellular telephone) and supplemental devices only have their respective modems. Cellular telephone must be in range of supplemental devices in order for utilization of supplemental device capabilities (e.g., can establish trust between devices without having a SIM card on each device).

There are at least two aspects for network-unassisted communicator approach, illustrated at 702 and 704. Either aspect 702, 704 can be utilized if the same identity is used at both mobile device 706 and communicator 708 and only one device (mobile device 706 or communicator 708) communicates with network using that identity. Aspect 702 includes a mobile device 706 that communicates with a communicator 708 over a peer-to-peer wireless link 710. Communicator 708 conveys data from mobile device 706 to WWAN 712, over a WWAN link 714. As illustrated, mobile device 706 includes a SIM 716.

Aspect 704 includes mobile device 706 that conveys data to communicator 708 over a peer-to-peer wireless link 710. Communicator 708 conveys data to WWAN 712 over WWAN link 714. In accordance with this aspect 704, mobile device 706 includes a SIM/VSIM 718 (e.g., software SIM) and communicator 708 includes a VSIM 720 (e.g., software SIM). In this aspect, network can program mobile device 706 and communicator 708 with software credentials and either (or both) mobile device 706 and communicator 708 can communicate, which can be a function of an a pre-arranged agreement between mobile device 706 and communicator 708.

Figure 8:
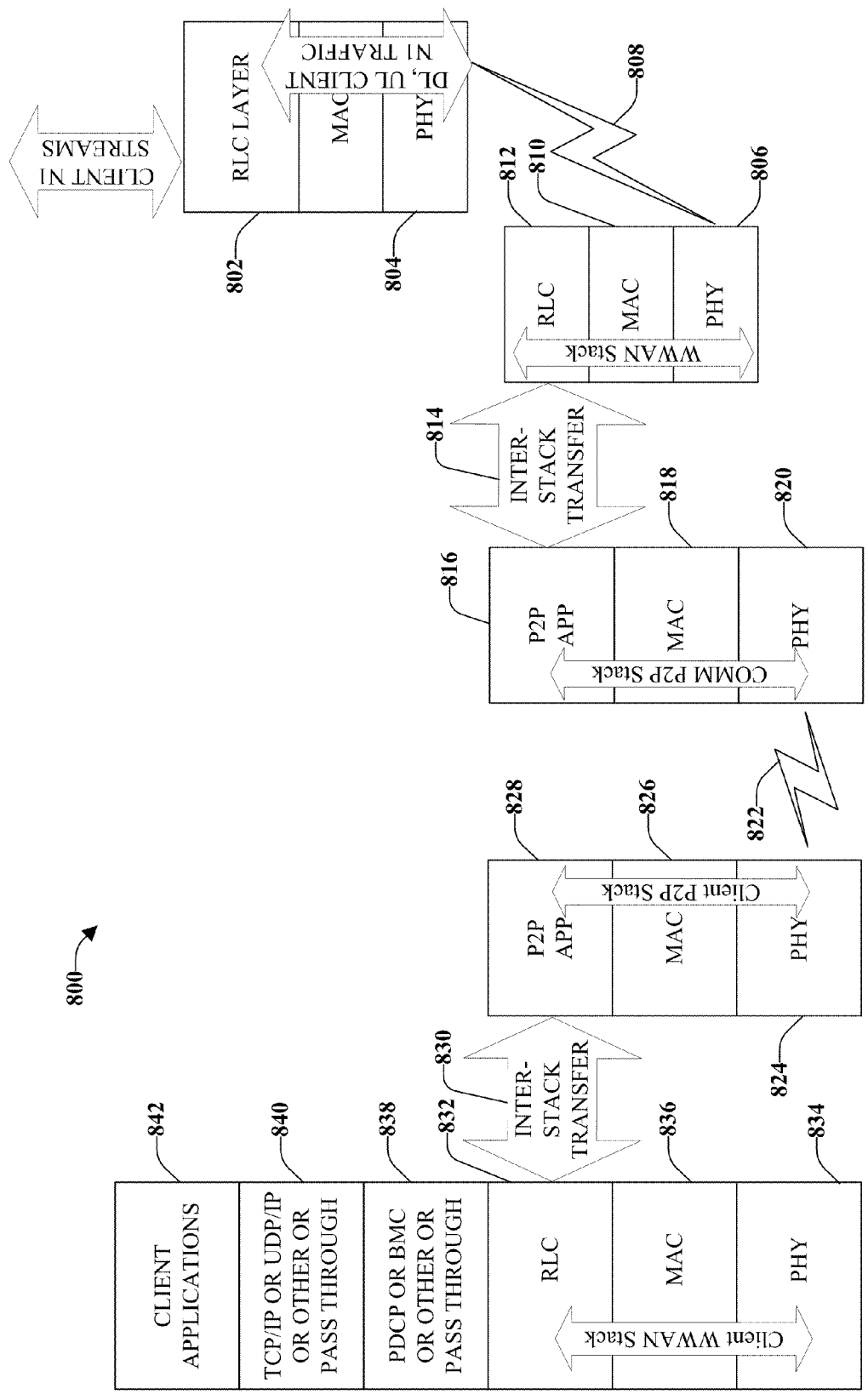
FIG. 8 illustrates an example schematic representation of partitioning a stack for utilization with the disclosed aspects.

FIG. 8 illustrates an example schematic representation 800 of partitioning a stack for utilization with the disclosed aspects. In accordance with some aspects, the entire WWAN stack can be processed on communicator. However, in accordance with other aspects, IP packets and application packets can be partitioned from the stack and the IP packets forwarded to mobile device (e.g., only the application is received at client). To provide energy savings for mobile device, various items can be offloaded to be performed by communicator. For example, all WWAN processing can be performed by communicator, including WWAN Access Stratum (AS) processing (PHY/MAC/RLC). WWAN Non-Access Stratum (NAS) proceeding (e.g., mobility management, dynamic standby processing offload). Further, communicator can perform local voice call application processing. In accordance with some aspects, communicator can perform selective data call application processing. Another benefit for mobile device is that if communicator WWAN link is better than client WWAN link (e.g., more antennas, better antenna location for communicator antenna), there can be improved network resource utilization and/or improved WWAN link performance for client applications.

In accordance with some aspects, MAC layer and PHY layer will not be split in order to more quickly process traffic. For example, if MAC layer remains on client and PHY layer is on communicator, coordination can become difficult and time restrictions (e.g., HARQ) become critical.

Client node processing is on the left hand side and communicator node processing is illustrated on the right hand side. On the top right side is the base station (e.g., Node B plus RNC for UMTS, eNodeB, and so forth). RLC layer 802 is managed at RNC Radio Network Controller and is forwarded to base station. A transmission from PHY Layer 804 of base station to PHY layer 806 of the communicator occurs, at 808. Traffic is routed through MAC layer 810 and RLC layer 812 of communicator. There is an inter-stack transfer 814 to peer-to-peer (P2P) application 816 (e.g., any short range radio, which may be lower energy). Traffic is pushed down though MAC layer 818 and PHY layer 820. Traffic is routed over local wireless link 822.

On client node processing, traffic arrives at PHY layer 824 and proceeds through MAC layer 826 and peer-to-peer (P2P) application 828. There is an inner stack transfer 830 from P2P application 828 to RLC layer 832 on client. As indicated, PHY layer 834 and MAC layer 836 are not utilized. Data traffic proceeds through RLC layer 832 and goes up to applications 838, 840, 842, which can be voice, web browser, and so forth.

On the way out, traffic goes to RLC layer 832 (instead of using MAC layer 836 or PHY layer 834) and an inter stack transfer 830, where it is sent to P2P application 828, through MAC layer 826 to PHY layer 824 and over local wireless link 822. It is received at PHY layer 820 on communicator node, proceeds through MAC layer, 818 and P2P application 816 and there is an inter stack transfer 814 to RLC layer 812, down through MAC layer 810 and PHY layer 808, where it is sent out.

As previously indicated there can be variations in partitioning of protocol stack. The partitioning illustrated and described herein are examples for purposes of understanding various aspects that may be employed.

In view of the exemplary systems shown and described above, methodologies that may be implemented in accordance with the disclosed subject matter, will be better appreciated with reference to the following flow charts. While, for purposes of simplicity of explanation, the methodologies are shown and described as a series of blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement the methodologies described herein. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 9:
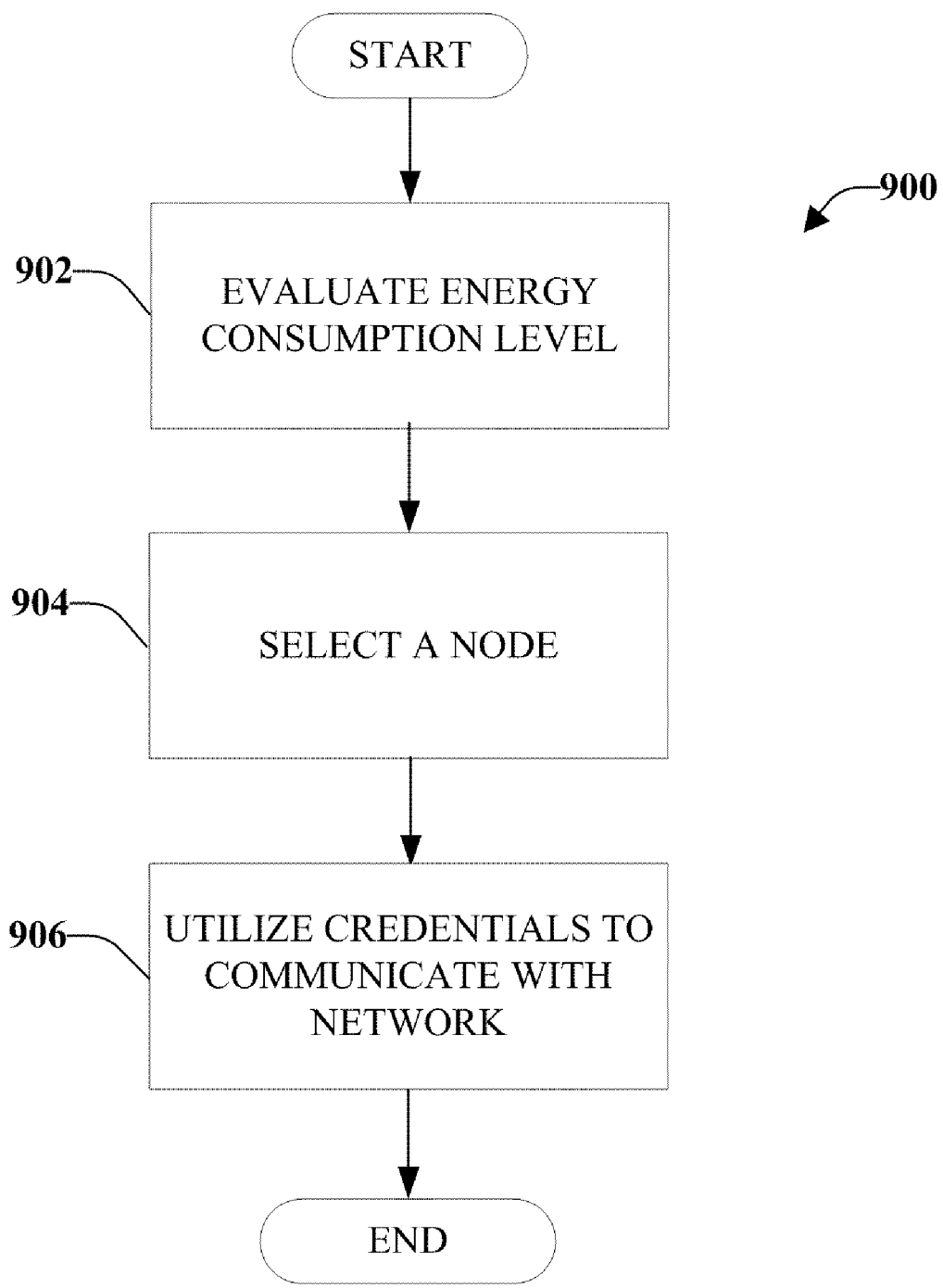
FIG. 9 illustrates a method for selecting a wireless wide area network communicator.

FIG. 9 illustrates a method 900 for selecting a wireless wide area network communicator. Method 900 is configured to enable a mobile device to select an appropriate node to communicate with a base station. The appropriate node is selected from a multitude of nodes. Selected node utilizes identity information of mobile device to communicate with base station.

Method 900 starts, at 902, when an energy consumption level for each of a plurality of nodes is evaluated. Each of the nodes can include a wireless wide area network modem. Evaluation can include measuring an energy consumption level for each of the plurality of nodes. In accordance with some aspects, evaluation includes receiving a measured energy consumption level for each of the plurality of nodes. Based on the evaluation, method 900 can continue by ascertaining the energy consumption level of mobile device is higher than the energy level of one of the received measured energy consumption levels. The node associated with the lower energy consumption level can be selected. In accordance with some aspects, method 900 includes receiving an indication to discover at least one node in the wireless wide area network before evaluating the energy consumption level for each of a plurality of nodes (e.g., a network assisted discovery mode).

At 904, one node from the plurality of nodes is selected as a wireless wide area network communicator. The section can be a function of mitigation of an energy consumption level of mobile device.

In accordance with some aspects, the selection can include comparing energy consumption level of mobile device and energy consumption level for each of the plurality of nodes. Based on the comparison, a direct link to wireless wide area network is selected if the energy consumption level of mobile device is lower than the energy consumption level of the plurality of nodes. Alternatively, if an energy consumption level of at least one of the plurality of nodes is less than the energy consumption level of mobile device, an indirect link to wireless wide area network can be selected.

According to some aspects, selection of the node can include evaluating a direct link quality and a quality for each of a plurality of indirect links. Each indirect link can be associated with a respective node from the plurality of nodes. Direct link can be chosen if quality of direct link is better than quality of each of the plurality of indirect links. Alternatively, one of the plurality of indirect links can be chosen if the particular indirect link is a better quality than the quality of direct link.

In accordance with another aspect, the selection can include determining an energy level of each of the plurality of nodes and an amount of energy expected to be consumed by each of the plurality of nodes for a communication. A node can be selected from the plurality of nodes as a function of energy consumed and an amount of energy available for communication. According to some aspects, the selection of the node is based on compliance with a tolerable amount of delay, wherein a node is not selected as a communicator if the delay experienced through utilization of that node would not comply with a delay requirement.

At 906, a credential of mobile device is utilized to communicate with wireless wide area network through the node selected as the wireless wide area network communicator.

Utilizing the credential can include utilizing the credential that is shared between mobile device and the node selected as the wireless wide area network communicator. According to some aspects, method 900 can include supplying a credential of mobile device to the node selected as wireless wide area network communicator. Further, method 900 can include bypassing a wireless wide area network modem of mobile device to enable communication over wireless wide area network by the one node selected as wireless wide area network communicator.

Method 900 can also include receiving packets from wireless wide area network over a direct link and determining a best estimate of received packets. The best estimate can be based on reception of a first set of packets along direct link and based on receipt of a second set of packets over an indirect link through the node selected as wireless wide area network communicator and another node that receives a third set of packets from wireless wide area network.

In accordance with some aspects, method 900 includes receiving communication tasks and a subset of computational tasks associated with the mobile device. The communication tasks and the subset of computational tasks are processed by the wireless wide area network communicator before being transmitted to mobile device. According to some aspects, method 900 includes receiving information from the wireless wide area network communicator, wherein the wireless wide area network communicator buffers the information for a period of time, aggregates prior buffered information with new information, or combinations thereof. According to some aspects, wireless wide area network communicator process received information before transmitting. Additionally, wireless wide area network communicator can make a determination whether to transmit information to mobile device as a function of the processing.

In accordance with some aspects, method 900 includes providing a configuration for processed information to wireless wide area network communicator. The configuration provides certain parameters, events, and so forth, that should be satisfied and, if not satisfied, the information is not communicated to client node. For example, the configuration can indicate that information should only be sent to client node if a certain event happens or based on some other parameter that can be determined from the processed information. If there is conformance to the configuration (as determined by wireless wide area network communicator), method 900 continues by receiving the processed information.

According to some aspects, method includes partitioning tasks between the mobile device and the wireless wide area network communicator based on at least one of energy levels of the mobile device, an energy level of the wireless wide area network communicator, an energy spent in the mobile device and the wireless wide area network communicator based on a partitioning, a performance of wireless wide area network links and peer to peer links, or a delay associated with a task partitioning, or combinations thereof.

According to some aspects, method 900 can include choosing to receive a first set of packets from, but not transmit packets to, wireless wide area network over a direct link. Additionally, method 900 can include receiving first set of packets from wireless wide area network and determining a best estimate of a received set of packets based on reception of the first set of packets along direct link and a second set of packets along an indirect link. Alternatively, method 900 can include determining a best estimate of a received set of packets based on reception of the first set of packets along direct link and based on receipt of a second set of packets over an indirect link through the node selected as wireless wide area network communicator and another node that receives a third set of packets from wireless wide area network.

Additionally or alternatively, method 900 can include receiving an instruction to sleep, or automatically entering sleep, when there is no information flow from the node selected as wireless wide area network communicator.

In accordance with some aspects, a computer program product can include a computer-readable medium that comprises codes for carrying out various aspects of method 900. Computer-readable medium can include a first set of codes for causing a computer to evaluate an energy consumption level for each of a plurality of nodes. Each of the plurality of nodes comprises a wireless wide area network modem. Computer-readable medium can also include a second set of codes for causing the computer to select one node from the plurality of nodes as a wireless wide area network communicator. The selecting can be a function of mitigation of an energy consumption level of mobile device. Further, computer-readable medium can include a third set of codes for causing the computer to utilize a credential of mobile device to communicate with wireless wide area network through the one node selected as wireless wide area network communicator.

In accordance with some aspects, computer-readable medium includes a fourth set of codes for causing the computer to evaluate a quality of a direct link and a quality for each of a plurality of indirect links. Each indirect link is associated with a respective node from the plurality of nodes. Also included in computer-readable medium is a fifth set of codes for causing the computer to choose direct link if quality of direct link is better than quality of the plurality of indirect links. Alternatively, the fifth set of codes can cause the computer to choose one of the plurality of indirect links if one of the plurality of indirect links is a better quality than quality of direct link.

According to some aspects, computer-readable medium includes a fourth set of codes for causing the computer to evaluate an energy level of each of the plurality of nodes and an amount of energy expected to be consumed by each of the plurality of nodes for a communication. Also included is a fifth set of codes for causing the computer to choose the one node from the plurality of nodes as a function of energy consumed and amount of energy available for communication.

In accordance with some aspects, a network can enable a peer to peer link discovery in a network assisted mode. In this case, network establishes that both modems (e.g., mobile device modem and communicator (or other node) modem) are communicating with the same base station registered with network. In accordance with some aspects, network has more refined information about the location of the modems (e.g., GPS location) and can suggest that the two modems attempt a discovery over a peer to peer link using a mutually compatible wireless protocol between the modems.

Figure 10:
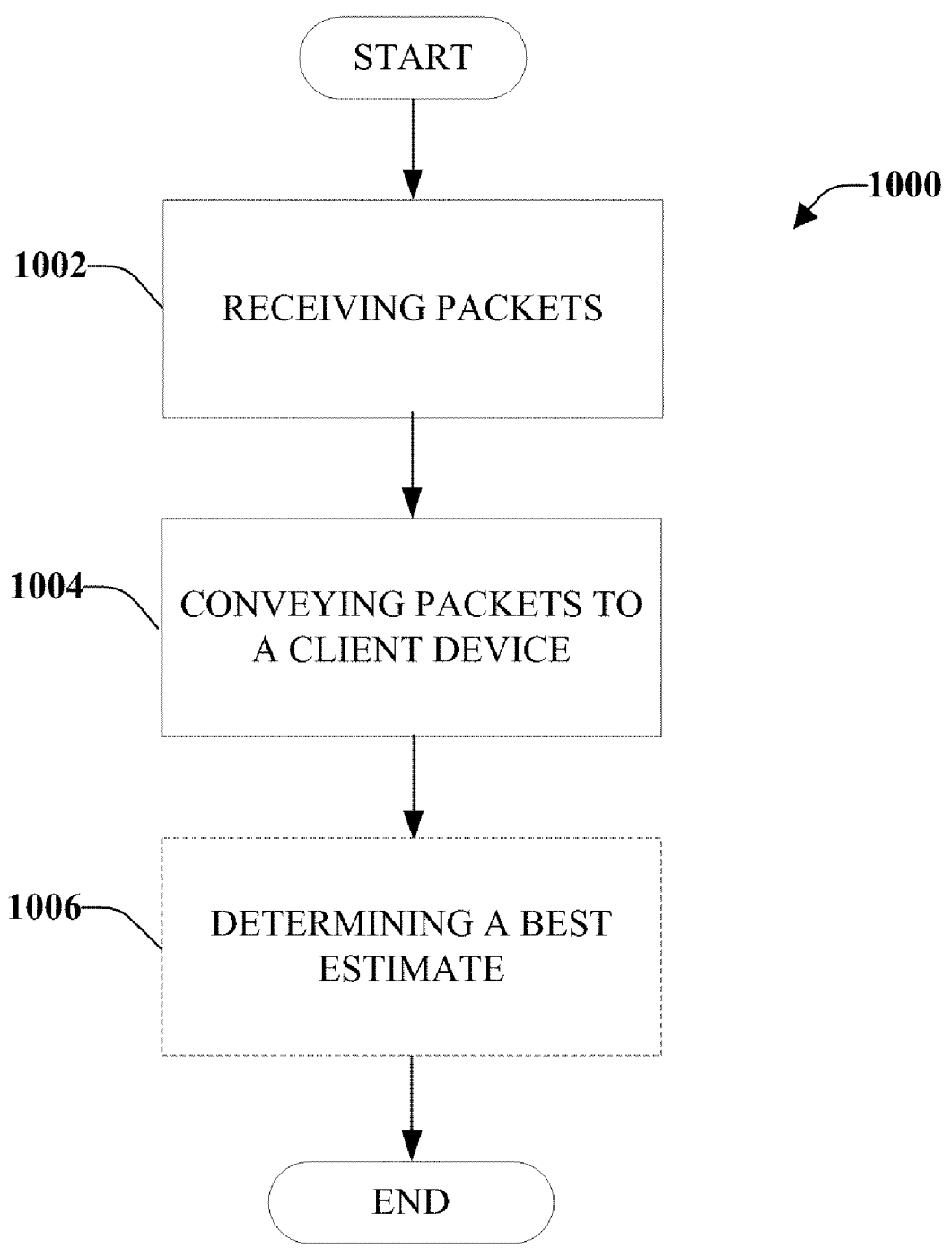
FIG. 10 illustrates a method for receiving packets intended for a client device in a wireless wide area network, according to an aspect.

FIG. 10 illustrates a method 1000 for receiving packets intended for a client device in a wireless wide area network, according to an aspect. Method 1000 starts, at 1002, when a first set of packets are received from wireless wide area network. The packets are intended for a client device that selected node, performing method 1000, to mitigate resource consumption at client device. At 1004, the packets from the wide area network are selectively conveyed to client device. In accordance with some aspects, method 1000 can include transmitting packets to the wireless wide area network on behalf of client device.

Selectively conveying first set of packets can include terminating a subset of client applications locally. Alternatively, selectively conveying first set of packets can include forwarding first set of packets to another device that accepts first set of packets for client device (and not relay first set of packets to client device). For example, a car modem can accept a phone call and terminate it locally (on its speakers and microphone). Alternatively, the car modem can accept a phone call but forward the call to a BlueTooth® wireless headset (e.g., it could be the headset associated with the phone), for example. This allows the phone to sleep, while the car modem uses the headset. In this case, ownership of the headset can be changed from the phone to the car modem. In another example, a wireless television signal or a multimedia communication (such as a voice and video conference call) could terminate on the car's display and the phone can sleep (conserving energy).

In accordance with some aspects, method 1000 includes processing a subset of computational tasks associated with the mobile device and one or more communication tasks before selectively conveying the first set of packets from the wireless wide area network to the client device. According to another aspect, method 1000 includes buffering the first set of packets from the wireless wide area network for a defined period of time before selectively conveying the first set of packets from the wireless wide area network to the client device. In accordance with a further aspect, method 1000 includes aggregating prior buffered information with information from the first set of packets before selectively conveying the first set of packets from the wireless wide area network to the client device.

According to some aspects, method 1000 includes processing the first set of packets before selectively conveying the first set of packets from the wireless wide area network to the client device. Further, method 1000 can include determining, based on the processing, whether to transmit information related to the first set of packets. The determination can be made based on network state information. If the network state information has not changed (e.g., static information), the information is not conveyed to the mobile device. In accordance with some aspects, a simplified representation of the information can be transmitted. For example, the simplified representation can be an indication that "nothing has changed."

In accordance with some aspects, method includes partitioning tasks related to the client device. The tasks are partitioned between the node and the client device. The partitioning can be a function of an energy level of the client device, an energy level of the node, an amount of energy spent by the client device and the node based on a partitioning, a performance of wireless wide area networking links and peer to peer links, a delay associated with a task partitioning, or combinations thereof.

In accordance with some aspects, method 1000 includes determining a best estimate of a set of received packets, at 1006. Determining a best estimate of a set of received packets can be based on reception of the first set of packets from the wide area network, based on reception of a second set of packets by a shared node that receives from, but does not transmit to, wireless wide area network, and based on a third set of packets received by the client device.

According to some aspects, determining a best estimate of a set of received packets is based on reception of the first set of packets from the wireless wide area network and based on reception of a second set of packets by a shared node that receives from, but does not transmit to, the wireless wide area network.

Method 1000 can also include transmitting packets to wireless wide area network on behalf of client device. Also, method includes determining a best estimate of received packets is based on reception of the first set of packets at the node and is based on reception of a second set of packets at client device.

In accordance with a further aspect, determining a best estimate of received packets is based on reception of a first set of packets at the node. Further, determining a best estimate is also based on reception of a second set of packets at a shared node that receives from, but does not transmit to, wireless wide area network and based on a third set of packets received by client device, wherein client device does not transmit packets directly to wireless wide area network.

Further, for delay tolerant applications, method 1000 can include buffering first set of packets, waking up client device, and delivering first set of packets to client device after a delay. This can allow client device to sleep longer (conserving energy). Thus, client device does not have to wake up immediately.

In accordance with some aspects, method 1000 includes selecting a most energy efficient subset of wireless modems for communication. The most energy efficient subset of wireless modems meets at least one parameter for delivery of information and wherein there are a plurality of wireless modems available between node and client device.

In an aspect, method 1000 includes receiving physical channels or radio bearers assigned to node for use on behalf of client device. Alternatively or additionally, method 1000 includes receiving logical channels or radio bearers assigned to node for use on behalf of client device.

Further, method 1000 can include allowing client device to sleep when there is no information to communicate to client device or when there is no information flow from node to client device for a specific interval. Additionally, in accordance with some aspects, a computer program product can include a computer-readable medium that comprises codes for carrying out various aspects of method 1000.

Figure 11:
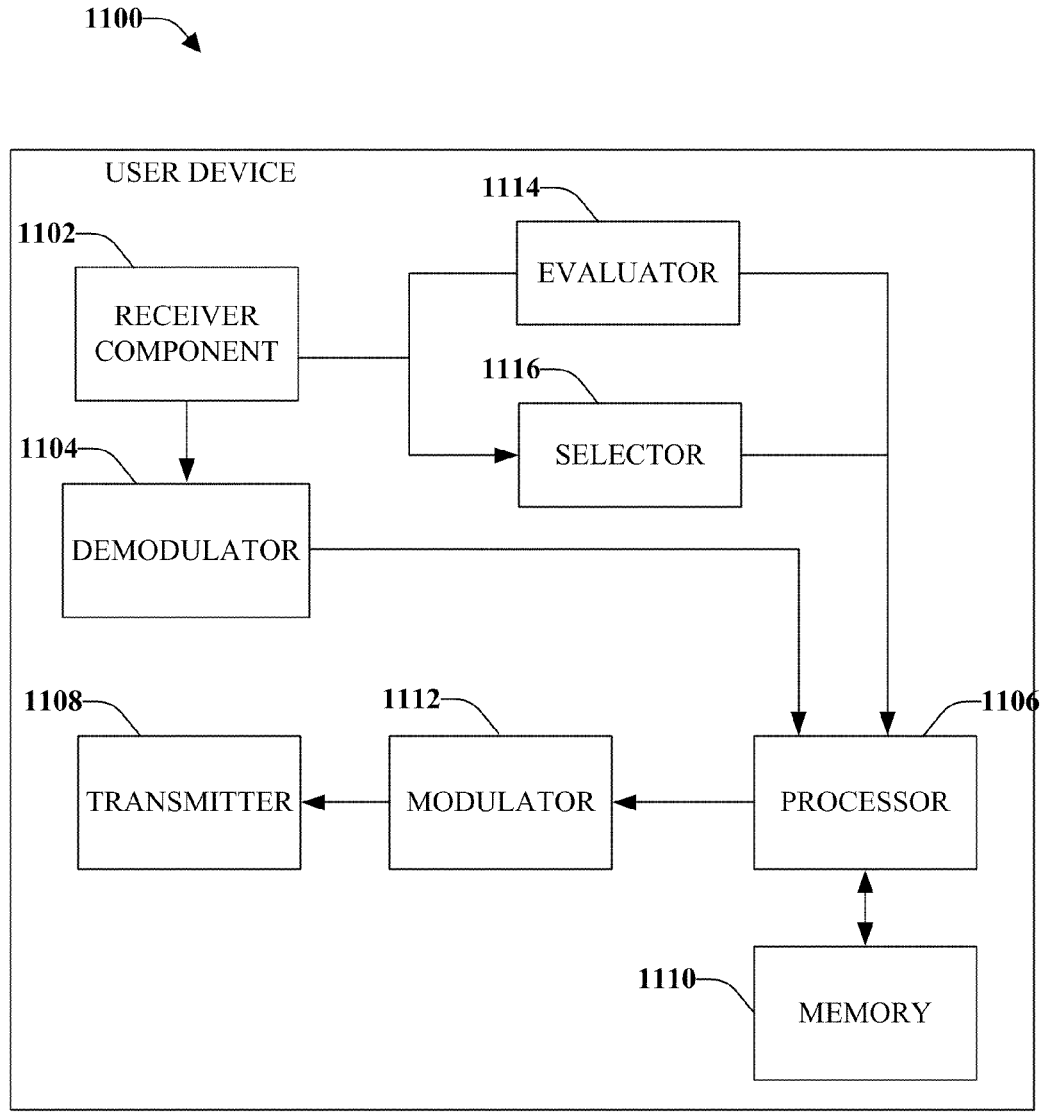
FIG. 11 illustrates a system that facilitates selection of shared wireless wide area network modems in accordance with one or more of the disclosed aspects.

With reference now to FIG. 11, illustrated is a system 1100 that facilitates selection of shared wireless wide area network modems in accordance with one or more of the disclosed aspects. System 1100 can reside in a user device. System 1100 comprises a receiver component 1102 that can receive a signal from, for example, a receiver antenna. Receiver component 1102 can perform typical actions thereon, such as filtering, amplifying, downconverting, and performing other functions related to received signal. Receiver component 1102 can also digitize the conditioned signal to obtain samples. A demodulator 1104 can obtain received symbols for each symbol period, as well as provide received symbols to a processor 1106.

Processor 1106 can be a processor dedicated to analyzing information received by receiver component 1102 and/or generating information for transmission by a transmitter 1108. In addition or alternatively, processor 1106 can control one or more components of system 1100, analyze information received by receiver component 1102, generate information for transmission by transmitter 1108, and/or control one or more components of system 1100. Processor 1106 may include a controller component capable of coordinating communications with additional user devices.

System 1100 can additionally comprise memory 1110 operatively coupled to processor 1106. Memory 1110 can store information related to coordinating communications and any other suitable information. Memory 1110 can additionally store protocols associated with selection of a communicator. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). System 1100 can further comprise a symbol modulator 1112, wherein transmitter 1108 transmits the modulated signal.

Receiver component 1102 is further operatively coupled to an evaluator 1114 that measures (or receives) various parameters associated with a direct link to a wireless wide area network or a multitude of indirect links to wireless wide area network. These various parameters include an energy consumption level, a data rate, a link quality, and so forth. Additionally, receiver component 1102 can be operatively coupled to a selector 1116 that decides whether to utilize direct link or one of the indirect links. If an indirect link is chosen, selector 1116 determines which indirect link to utilize (e.g., which communicator to utilize) to communicate with wireless wide area network.

Figure 12:
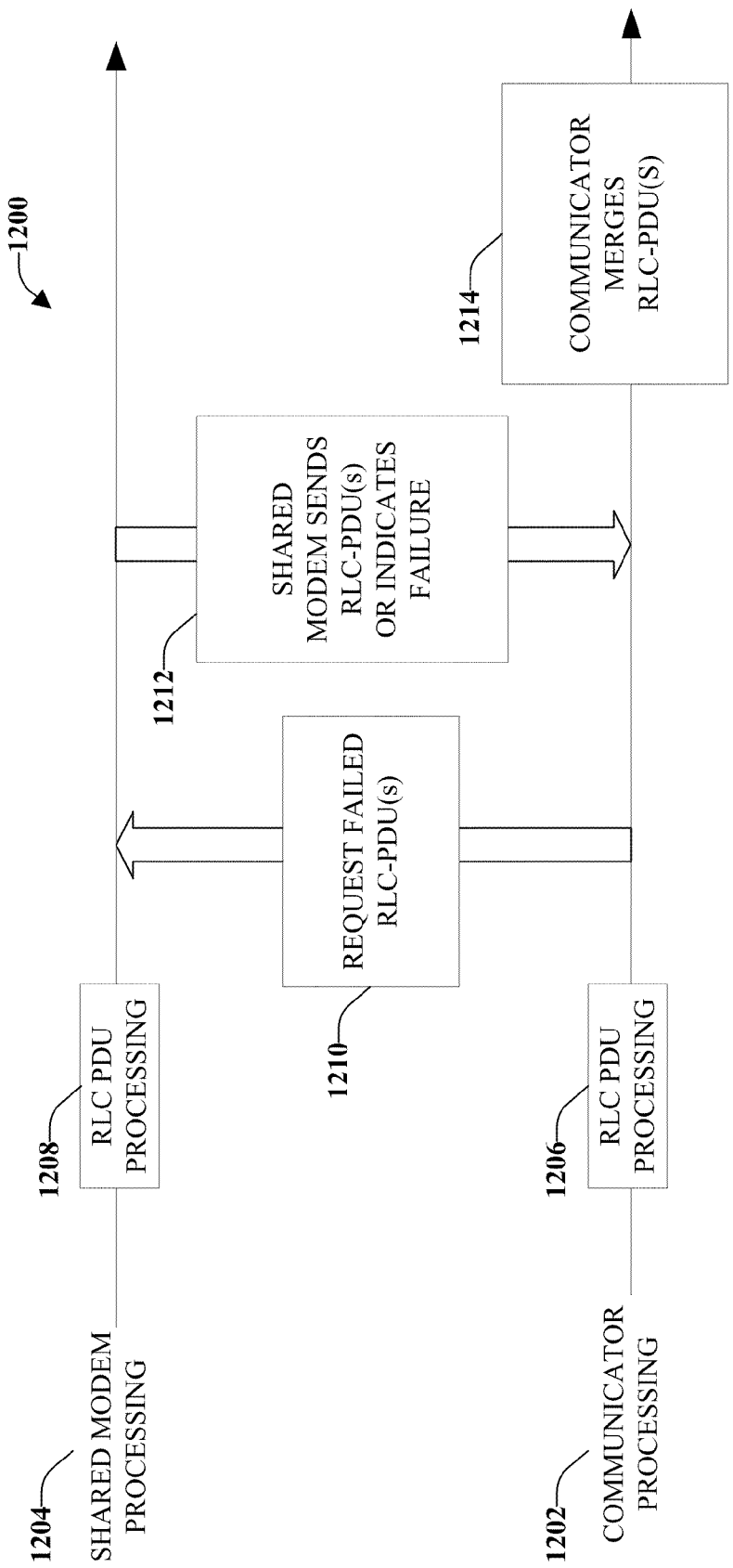
FIG. 12 illustrates a message flow diagram that demonstrates combining of protocol data units at a communicator node for a client.

FIG. 12 illustrates a message flow diagram 1200 that demonstrates combining of Protocol Data Units (PDUs) at a communicator node for a client device. In accordance with some aspects, the shared WWAN modems near a client device could exploit a diversity of reception between the shared WWAN modems. The WWAN modem associated with client device, and the WWAN modem associated with communicator, along with other shared WWAN modems near client device, can work together to improve reception of WWAN downlink traffic on client device. For example, there can be three devices, a phone (which is the end client device), a car modem, and a laptop. Phone is the end client device, car modem is the communicator and laptop is an additional shared node. Car modem and laptop can perform processing and, if needed, can combine their received versions. This combined version can be forwarded to phone. This can mitigate the amount of processing needed to be performed by phone (or other client device), which can conserve resources of client device.

All shared WWAN devices are configured to be able to receive and process the downlink packets for client device. Receive (Rx) diversity at the Physical (PHY) layer is plausible. A shared WWAN modem could provide its received soft bits along with a quality metric (such as ((1−Pe)/Pe) or a path metric from a Viterbi decoder) to enable weighted combining of soft bits. Alternatively, a shared WWAN modem could send its decoded hard bits to the modem that performs the combining (this could be typically either client device or communicator device).

It is possible that practical limitations due to latencies for transmission over the wireless link between the shared WWAN modems may limit the ability to accomplish PHY-layer Rx diversity. Due to the latency involved in data exchange over the peer-to-peer wireless link (this latency could be of the order of a few milliseconds), it would be desirable to pursue diversity of reception of packets at a layer above the PHY and MAC layers in each of the modems. For example, in the case of the UMTS protocol, the received packets at the RLC-PDU (Radio Link Control-Protocol Data Unit) layer (or the received packets at an IP layer) could be combined across the modems. In general, all available shared WWAN modems could opportunistically process all RLC-PDUs received for a client.

Referring now to the figure, communicator processing 1202 and shared modem processing 1204 include respective RLC-PDU processing 1206 and 1208. For example, with regard to reception of RLC-PDUs, if client device fails to receive an RLC-PDU successfully even after HARQ processes have completed for RLC-PDU through a communicator node, then client device or communicator can make a request, at 1210, to all shared WWAN modems to forward their versions of the RLC-PDU. If a shared WWAN modem has successfully received the same PDU, then it could forward that RLC-PDU to client, at 1212. In accordance with some aspects, if there was a failure in processing, a failure can be indicated, at 1212. If shared WWAN modems provide such cooperation for client device, then bit-level combining of RLC-PDUs can be performed even if all received versions are in error, to recover the RLC-PDU across clients. If additional quality metrics associated with the RLC-PDUs are available for combining, then those can be used to perform combining such as weighted Chase combining of RLC-PDU vectors across received versions of vectors across clients. PLC-PDUs from shared modem can be merged with internal RLC-PDU stream, at 1214, and forwarded to client device.

In another variation, each shared WWAN modem could opportunistically send a message to client device or communicator device regarding all RLC-PDUs that it has successfully received, however, this may result in additional processing costs on client device or/or on communicator device. It is possible that client device does not participate in such combining so that the WWAN processing sub-system at client device is allowed to sleep. Such combining is then performed across one or more of the shared WWAN modems including the communicator, managed typically at the communicator node, and subsequently the combined result is sent by communicator node to client node over the peer-to-peer link between communicator node and client node. If client node directly communicates with the WWAN instead of using the communicator, then such combining can be directly performed at client node itself. Such combining can result in improved performance without requiring retransmissions of packets from the network.

Figure 13:
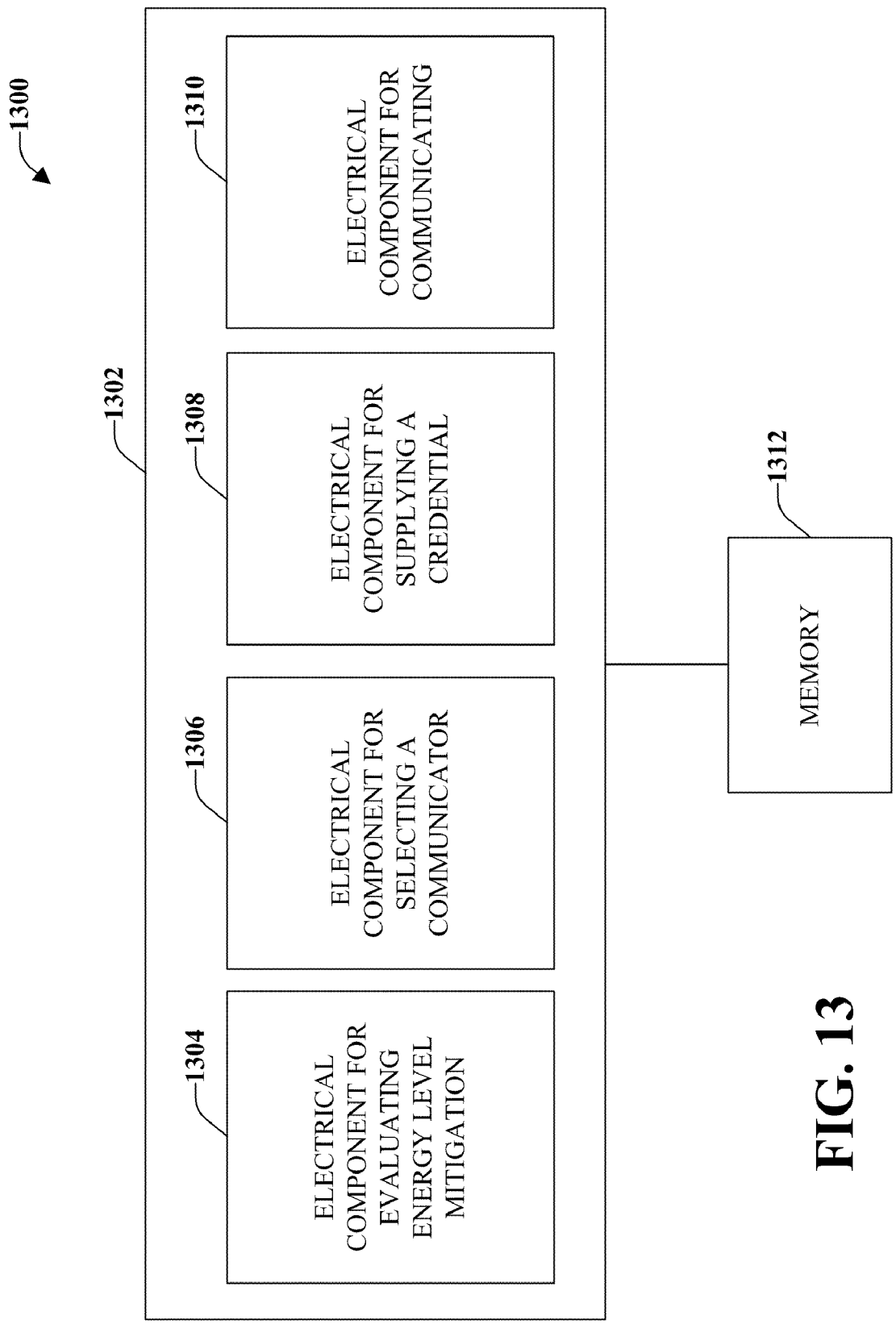
FIG. 13 illustrates an example system that selects a communicator for exchanging traffic with a wireless wide area network.

With reference to FIG. 13, illustrated is an example system 1300 that selects a communicator for exchanging traffic with a wireless wide area network, according to an aspect. System 1300 may reside at least partially within a wireless communications apparatus. It is to be appreciated that system 1300 is represented as including functional blocks, which may be functional blocks that represent functions implemented by a processor, software, or combination thereof (e.g., firmware).

System 1300 includes a logical grouping 1302 of electrical components that can act separately or in conjunction. Logical grouping 1302 may include an electrical component 1304 for evaluating whether an energy level of wireless communications apparatus is mitigated by usage of a communicator selected from a plurality of communicators. According to some aspects, electrical component 1304 for evaluating measures an energy consumption level for each of the plurality of communicators. However, in accordance with other aspects, electrical component 1304 for evaluating receives information from each of the plurality of communicators in order for electrical component 1304 to perform its functions.

Also included in logical grouping 1302 is an electrical component 1306 for selecting a communicator. In accordance with some aspects, electrical component 1306 for selecting utilizes a direct link to communicate with wireless wide area network if energy consumption level of wireless communications apparatus is lower than an energy consumption level for the plurality of communicators.

In accordance with some aspects, electrical component 1304 for evaluating estimates a quality of a direct link and qualities of indirect links associated with each of the plurality of communicators. Electrical component 1306 for selecting utilizes direct link if quality of direct link is better that qualities of the indirect links associated with each of the plurality of communicators. According to some aspects, electrical component 1304 for evaluating estimates a quality of a direct link and qualities of indirect links associated with each of the plurality of communicators. Electrical component 1306 for selecting utilizes one indirect link from indirect links associated with each of the plurality of communicators if quality of the one indirect link is better than quality of direct link.

According to some aspects, electrical component 1304 for evaluating determines an energy level of each of the plurality of communicators and determines an amount of energy expected to be consumed by each of the plurality of communicators. Electrical component 1306 for selecting chooses the communicator from the plurality of communicators as a function of energy level and amount of energy expected to be consumed.

Also included in logical grouping 1302 is an electrical component 1308 for supplying a credential of wireless communications apparatus to communicator. Further, logical grouping 1302 includes an electrical component 1308 for communicating with a wireless wide area network through a modem of communicator with credentials of wireless communications apparatus. Electrical component 1310 for communicating can bypass a wireless wide area network modem of wireless communications apparatus to enable a communication though selected communicator.

Additionally, system 1300 can include a memory 1312 that retains instructions for executing functions associated with electrical components 1304, 1306, 1308, and 1310 or other components. While shown as being external to memory 1312, it is to be understood that one or more of electrical components 1304, 1306, 1308, and 1310 may exist within memory 1312.

Figure 14:
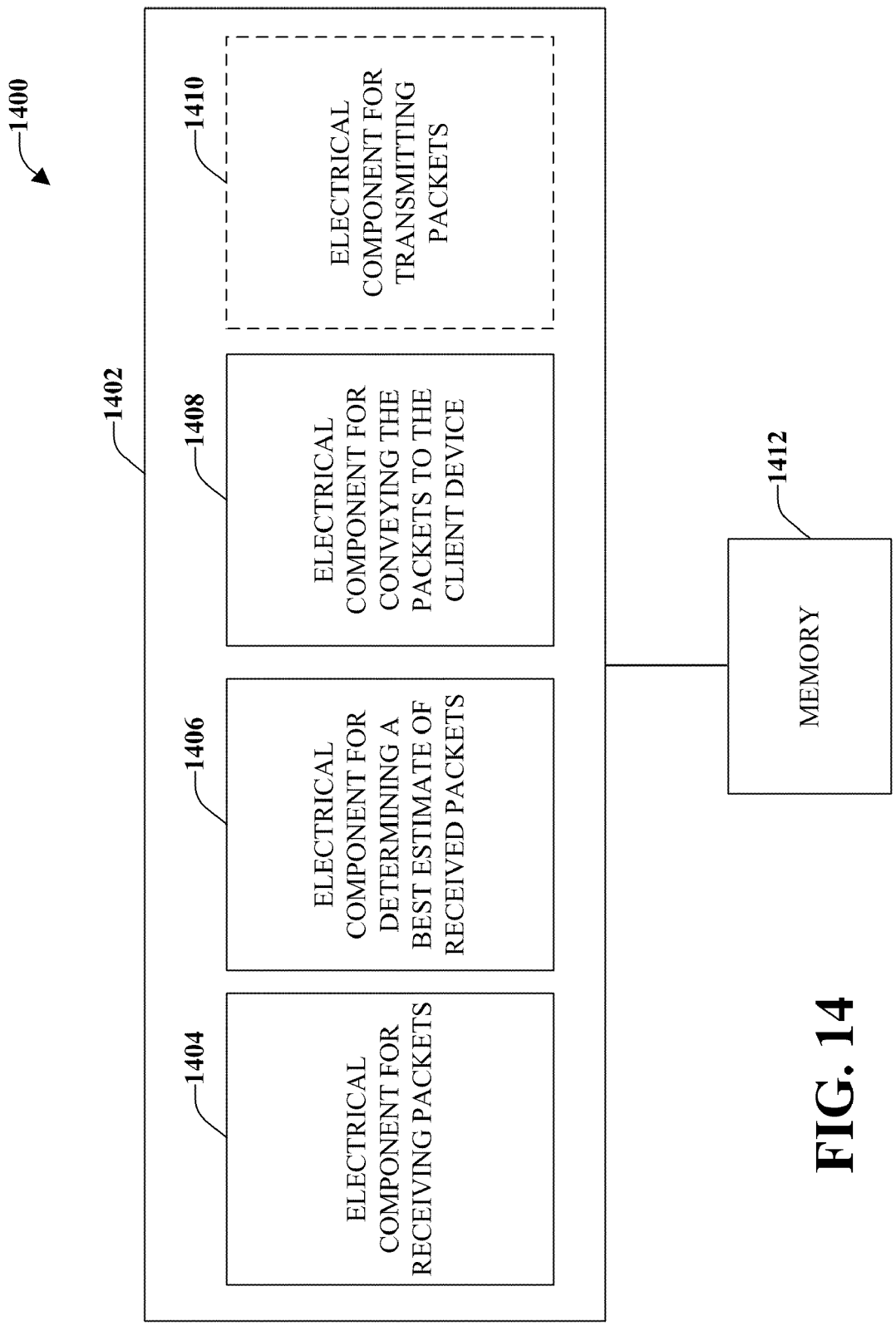
FIG. 14 illustrates an example system that receives packets intended for a client device in a wireless wide area network, according to an aspect.

FIG. 14 illustrates an example system 1400 that receives packets intended for a client device in a wireless wide area network, according to an aspect. System 1400 may reside at least partially within a wireless communications apparatus. System 1400 is represented as including functional blocks, which may be functional blocks that represent functions implemented by a processor, software, or combination thereof (e.g., firmware).

System 1400 includes a logical grouping 1402 of electrical components that can act separately or in conjunction. Logical grouping 1402 includes an electrical component 1404 for r receiving packets from a wireless wide area network, wherein the packets are intended for a client device. Also included in logical grouping 1402 is an electrical component 1406 for determining a best estimate of received packets. Further, logical grouping includes an electrical component 1408 for conveying the packets from the wireless wide area network to the client device, wherein the wireless communications apparatus was selected by the client device to mitigate resource consumption at the client device.

In accordance with some aspects, electrical component 1406 determines a best estimate of received packets based on reception of the packets from the wireless wide area network, based on reception of packets by a shared node that receives from, but does not transmit to, the wireless wide area network, and based on packets received by the client device.

According to some aspects, electrical component 1406 determines best estimate of received packets based on reception of the packets from the wireless wide area network and based on reception of packets by a shared node that receives from, but does not transmit to, the wireless wide area network.

In accordance with a further aspect, electrical component 1406 determines a best estimate of received packets based on reception of packets at the node, based on reception of packets at a shared node that receives from, but does not transmit to, the wireless wide area network, and based on packets received by the client device, wherein the client device does not transmit packets directly to the wireless wide area network.

Logical grouping 1402 can also include an electrical component 1410 for transmitting packets to the wireless wide area network on behalf of the client device. Electrical component 1406 can determine a best estimate of received packets based on reception of the packets at the node and based on reception of packets at the client device.

Additionally, system 1400 can include a memory 1412 that retains instructions for executing functions associated with electrical components 1404, 1406, 1408, and 1410 or other components. While shown as being external to memory 1412, it is to be understood that one or more of electrical components 1404, 1406, 1408, and 1410 may exist within memory 1412.

Figure 15:
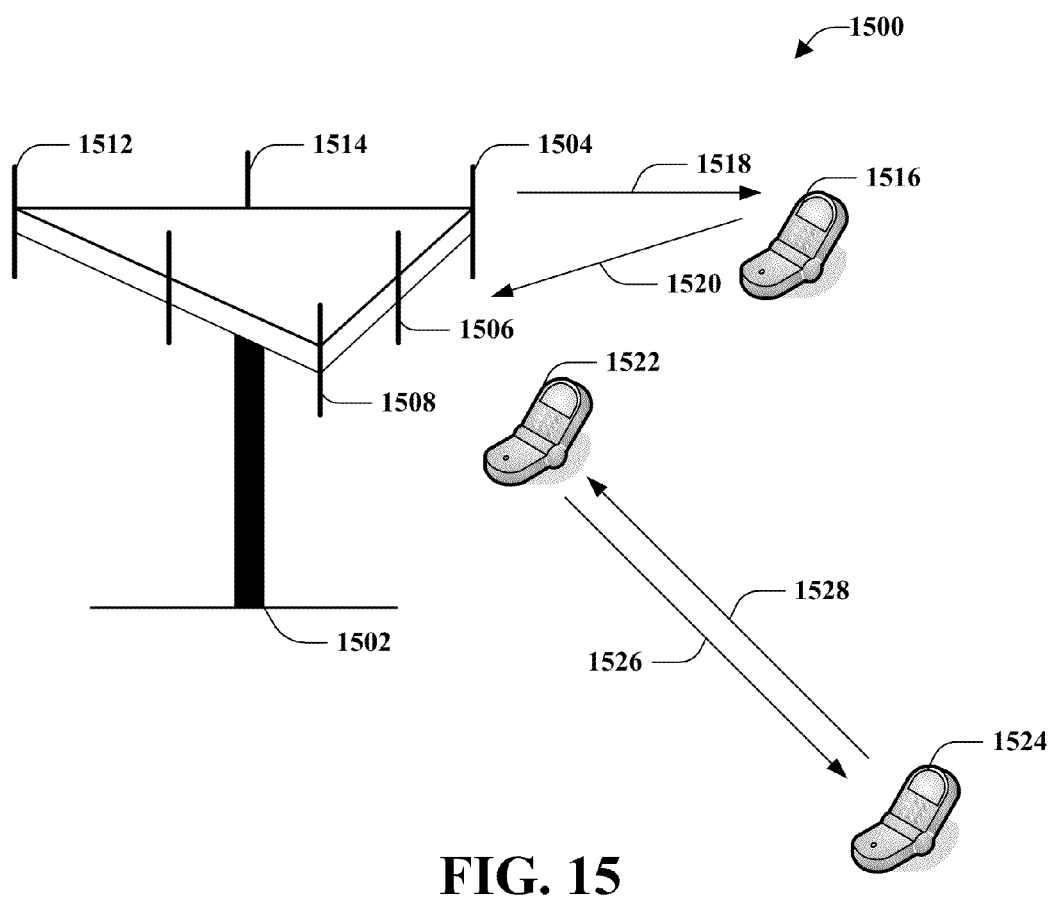
FIG. 15 illustrates a wireless communication system in accordance with various aspects.

Referring now to FIG. 15, illustrated is a wireless communication system 1500 in accordance with various aspects. System 1500 comprises a base station 1502 that can include multiple antenna groups. For example, one antenna group can include antennas 1504 and 1506, another group can comprise antennas 1508 and 1510, and an additional group can include antennas 1512 and 1514. Two antennas are illustrated for each antenna group; however, more or fewer antennas can be utilized for each group. Base station 1502 can additionally include a transmitter chain and a receiver chain, each of which can in turn comprise a plurality of components associated with signal transmission and reception (e.g., processors, modulators, multiplexers, demodulators, demultiplexers, antennas, and so forth), as will be appreciated by one skilled in the art. Additionally, base station 1502 can be a home base station, a Femto base station, and/or the like.

Base station 1502 can communicate with one or more devices such as device 1516; however, it is to be appreciated that base station 1502 can communicate with substantially any number of devices similar to device 1516. As depicted, device 1516 is in communication with antennas 1504 and 1506, where antennas 1504 and 1506 transmit information to device 1516 over a forward link 1518 and receive information from device 1516 over a reverse link 1520. In a frequency division duplex (FDD) system, forward link 1518 can utilize a different frequency band than that used by reverse link 1520, for example. Further, in a time division duplex (TDD) system, forward link 1518 and reverse link 1520 can utilize a common frequency band.

In addition, devices 1522 and 1524 can be communicating with one another, such as in a peer-to-peer configuration. Moreover, device 1522 is in communication with device 1524 using links 1526 and 1528. In a peer-to-peer ad hoc network, devices within range of each other, such as devices 1522 and 1524, communicate directly with each other without a base station 1502 and/or a wired infrastructure to relay their communication. Additionally, peer devices or nodes can relay traffic. Devices within network communicating in a peer-to-peer manner can function similar to base stations and relay traffic or communications to other devices, functioning similar to base stations, until the traffic reaches its ultimate destination. Devices can also transmit control channels, which carry information that can be utilized to manage the data transmission between peer nodes.

A communication network can include any number of devices or nodes that are in wireless (or wired) communication. Each node can be within range of one or more other nodes and can communicate with the other nodes or through utilization of the other nodes, such as in a multi-hop topography (e.g., communications can hop from node to node until reaching a final destination). For example, a sender node may wish to communicate with a receiver node. To enable packet transfer between sender node and receiver node, one or more intermediate nodes can be utilized. It should be understood that any node can be a sender node and/or a receiver node and can perform functions of either sending and/or receiving information at substantially the same time (e.g., can broadcast or communicate information at about the same time as receiving information) or at different times.

Figure 16:
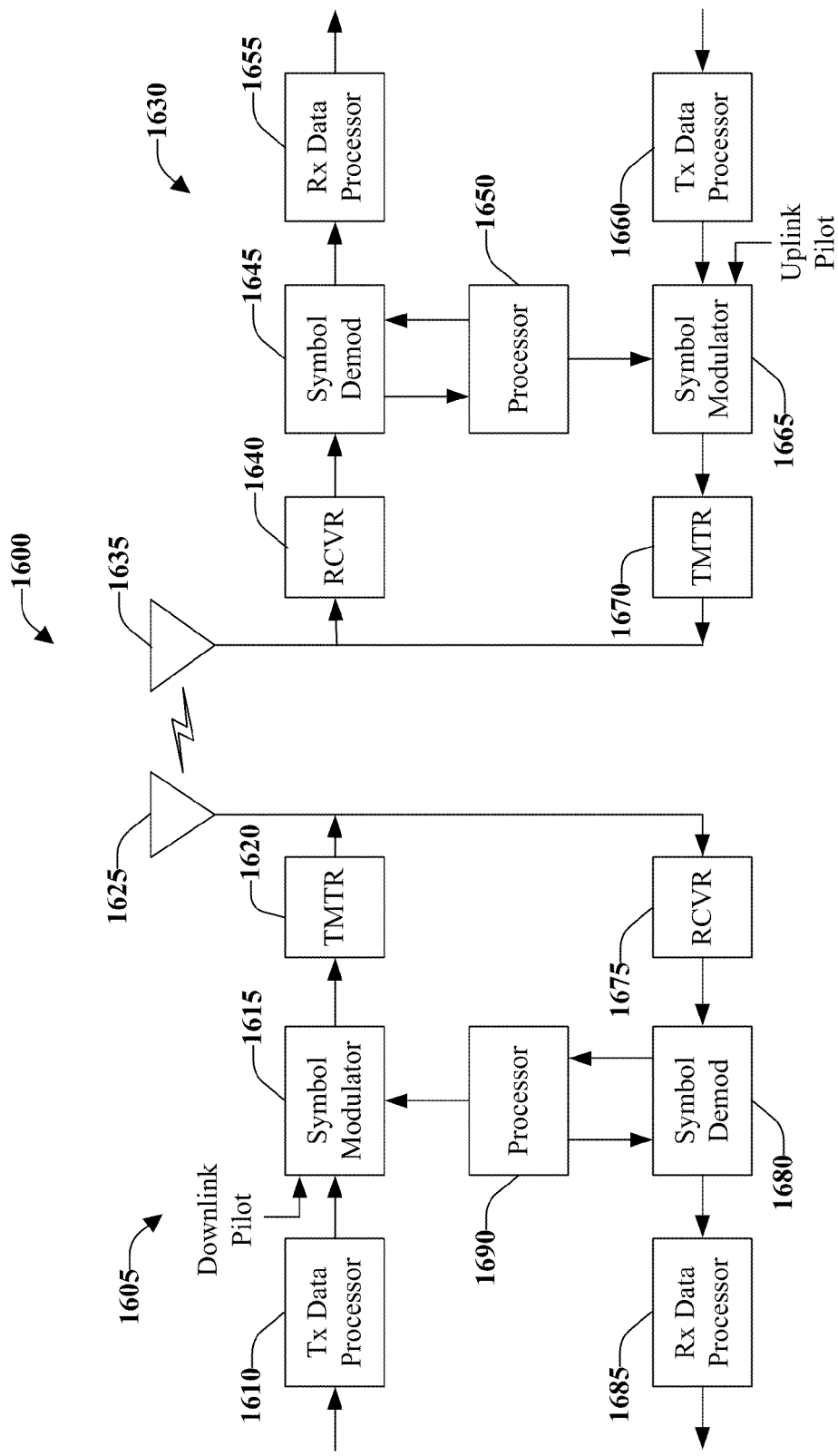
FIG. 16 illustrates an exemplary wireless communication system, according to various aspects.

FIG. 16 illustrates an exemplary wireless communication system 1600, according to various aspects. Wireless communication system 1600 depicts one base station and one terminal for sake of brevity. However, it is to be appreciated that wireless communication system 1600 can include more than one base station or access point and/or more than one terminal or user device, wherein additional base stations and/or terminals can be substantially similar or different from the exemplary base station and terminal described below. In addition, it is to be appreciated that the base station and/or the terminal can employ the systems and/or methods described herein to facilitate wireless communication there between.

Referring now to FIG. 16, on a downlink, at access point 1605, a transmit (TX) data processor 1610 receives, formats, codes, interleaves, and modulates (or symbol maps) traffic data and provides modulation symbols ("data symbols"). A symbol modulator 1615 receives and processes the data symbols and pilot symbols and provides a stream of symbols. A symbol modulator 1615 multiplexes data and pilot symbols and obtains a set of N transmit symbols. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

A transmitter unit (TMTR) 1620 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1625 to the terminals. At terminal 1630, an antenna 1635 receives the downlink signal and provides a received signal to a receiver unit (RCVR) 1640. Receiver unit 1640 conditions (e.g., filters, amplifies, and frequency downconverts) the received signal and digitizes the conditioned signal to obtain samples. A symbol demodulator 1645 obtains N received symbols and provides received pilot symbols to a processor 1650 for channel estimation. Symbol demodulator 1645 further receives a frequency response estimate for the downlink from processor 1650, performs data demodulation on the received data symbols to obtain data symbol estimates (which are estimates of the transmitted data symbols), and provides the data symbol estimates to an RX data processor 1655, which demodulates (e.g., symbol demaps), deinterleaves, and decodes the data symbol estimates to recover the transmitted traffic data. The processing by symbol demodulator 1645 and RX data processor 1655 is complementary to the processing by symbol modulator 1615 and TX data processor 1610, respectively, at access point 1605.

On the uplink, a TX data processor 1660 processes traffic data and provides data symbols. A symbol modulator 1665 receives and multiplexes the data symbols with pilot symbols, performs modulation, and provides a stream of symbols. A transmitter unit 1670 then receives and processes the stream of symbols to generate an uplink signal, which is transmitted by the antenna 1635 to the access point 1605.

At access point 1605, the uplink signal from terminal 1630 is received by the antenna 1625 and processed by a receiver unit 1675 to obtain samples. A symbol demodulator 1680 then processes the samples and provides received pilot symbols and data symbol estimates for the uplink. An RX data processor 1685 processes the data symbol estimates to recover the traffic data transmitted by terminal 1630. A processor 1690 performs channel estimation for each active terminal transmitting on the uplink.

Processors 1690 and 1650 direct (e.g., control, coordinate, manage, . . . ) operation at access point 1605 and terminal 1630, respectively. Respective processors 1690 and 1650 can be associated with memory units (not shown) that store program codes and data. Processors 1690 and 1650 can also perform computations to derive frequency and impulse response estimates for the uplink and downlink, respectively.

For a multiple-access system (e.g., FDMA, OFDMA, CDMA, TDMA, and the like), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof With software, implementation can be through modules (e.g., procedures, functions, and so on) that perform the functions described herein. The software codes may be stored in memory unit and executed by the processors 1690 and 1650.

It is to be understood that the aspects described herein may be implemented by hardware, software, firmware or any combination thereof When implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art. Further, at least one processor may include one or more modules operable to perform the functions described herein.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform the functions described herein.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

While the foregoing disclosure discusses illustrative aspects and/or aspects, it should be noted that various changes and modifications could be made herein without departing from the scope of the described aspects and/or aspects as defined by the appended claims. Accordingly, the described aspects are intended to embrace all such alterations, modifications and variations that fall within scope of the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:

1. A method performed by a mobile device for selecting a wireless wide area network communicator, comprising:
   evaluating an energy consumption level for each of a plurality of nodes, wherein each of the plurality of nodes comprises a wireless wide area network modem;
   selecting a node from the plurality of nodes as the wireless wide area network communicator, wherein the selecting is a function of mitigation of the energy consumption level of the mobile device, and the selecting at least comprises:
   comparing the energy consumption level of the mobile device and an energy consumption level for each of the plurality of nodes, and
   selecting a direct link to a wireless wide area network if the energy consumption level of the mobile device is lower than the energy consumption level for each of the plurality of nodes, or
   selecting an indirect link to the wireless wide area network if the energy consumption level of at least one of the plurality of nodes is less than the energy consumption level of the mobile device; and
   utilizing a credential of the mobile device to communicate with the wireless wide area network through the node selected as the wireless wide area network communicator.

2. The method of claim 1, wherein selecting the node from the plurality of nodes, further comprises selecting the node based on compliance with a tolerable amount of delay.

3. The method of claim 1, wherein utilizing the credential of the mobile device comprises utilizing the credential that is shared between the mobile device and the node selected as the wireless wide area network communicator.

4. The method of claim 1, further comprising:
   receiving packets from the wireless wide area network over a direct link; and
   determining a best estimate of received packets based on reception of a first set of packets along the direct link and based on receipt of a second set of packets over an indirect link through the node selected as the wireless wide area network communicator and another node that receives a third set of packets from the wireless wide area network.

5. The method of claim 1, further comprising:
   choosing to receive a first set of packets from, but not transmit packets to, the wireless wide area network over a direct link.

6. The method of claim 5, further comprising:
   receiving the first set of packets from the wireless wide area network; and
   determining a best estimate of a received set of packets based on reception of the first set of packets along the direct link and a second set of packets along an indirect link.

7. The method of claim 5, further comprising:
   determining a best estimate of a received set of packets based on reception of the first set of packets along the direct link and based on receipt of a second set of packets over an indirect link through the node selected as the wireless wide area network communicator and another node that receives a third set of packets from the wireless wide area network.

8. The method of claim 1, further comprising:
   receiving an instruction to sleep, or automatically entering sleep, when there is no information flow from the node selected as the wireless wide area network communicator.

9. The method of claim 1, further comprising:
   receiving an indication to discover at least one node in the wireless wide area network before evaluating the energy consumption level for each of the plurality of nodes.

10. The method of claim 1, further comprising:
    receiving communication tasks and a subset of computational tasks associated with the mobile device, wherein the communication tasks and the subset of computational tasks are processed by the wireless wide area network communicator.

11. The method of claim 1, further comprising:
    partitioning tasks between the mobile device and the wireless wide area network communicator based on at least one of energy levels of the mobile device, an energy level of the wireless wide area network communicator, an energy spent in the mobile device and the wireless wide area network communicator based on a partitioning, a performance of wireless wide area network links and peer to peer links, or a delay associated with a task partitioning, or combinations thereof.

12. The method of claim 1, further comprising:
    receiving information from the wireless wide area network communicator, wherein the wireless wide area network communicator buffers the information for a period of time, aggregates prior buffered information with new information, or combinations thereof.

13. The method of claim 1, further comprising:
    providing, to the wireless wide area network communicator, a configuration for processed information; and
    receiving the processed information if there is a conformance to the configuration.

14. A wireless communications apparatus, comprising:
    a memory that retains instructions related to:
    determining if an energy consumption level of the wireless communications apparatus is mitigated by usage of a communicator selected from a plurality of communicators,
    selecting the communicator at least comprises:
    comparing the energy consumption level of the wireless communications apparatus and an energy consumption level for each of the plurality of communicators, and
    utilizing a direct link to communicate with a wireless wide area network if the energy consumption level of the wireless communications apparatus is lower than the energy consumption level of each of the plurality of communicators, or utilizing an indirect link to communicate with the wireless wide area network if the energy consumption level of at least one of the plurality of communicators is less than the energy consumption level of the wireless communications apparatus, supplying a credential of the wireless communications apparatus to the communicator, and communicating with the wireless wide area network through a modem of the communicator with the credential of the wireless communications apparatus; and a processor, coupled to the memory, configured to execute the instructions retained in the memory.

15. The wireless communications apparatus of claim 14, wherein the memory retains further instructions related to receiving packets from the wireless wide area network over a direct link and determining a best estimate of received packets based on reception of a first set of packets along the direct link and based on receipt of a second set of packets over an indirect link through the communicator and another node that receives a third set of packets from the wireless wide area network.

16. The wireless communications apparatus of claim 14, wherein the memory retains further instructions related to choosing to receive a first set of packets from, but not transmit packets to, the wireless wide area network over a direct link, receiving the first set of packets over the direct link, and determining a best estimate of a set of received packets based on reception of the first set of packets along the direct link and a second set of packets along an indirect link.

17. A wireless communications apparatus that selects a communicator for exchanging traffic with a wireless wide area network, comprising:

means for evaluating whether an energy consumption level of the wireless communications apparatus is mitigated by usage of the communicator selected from a plurality of communicators;

means for selecting the communicator at least comprises:

means for comparing the energy consumption level of the wireless communications apparatus and an energy consumption level for each of the plurality of communicators, and means for utilizing a direct link to communicate with the wireless wide area network if the energy consumption level of the wireless communications apparatus is lower than the energy consumption level of each of the plurality of communicators, or means for utilizing an indirect link to communicate with the wireless wide area network if the energy consumption level of at least one of the plurality of communicators is less than the energy consumption level of the wireless communications apparatus;

means for supplying a credential of the wireless communications apparatus to the communicator; and means for communicating with the wireless wide area network through a modem of the communicator with credentials of the wireless communications apparatus.

18. A computer program product, comprising:

a non-transitory computer-readable medium comprising:

a first set of codes for causing a computer to evaluate an energy consumption level for each of a plurality of nodes, wherein each of the plurality of nodes comprises a wireless wide area network modem;

a second set of codes for causing the computer to select one node from the plurality of nodes as a wireless wide area network communicator, wherein the selecting is a function of mitigation of an energy level consumed by a mobile device, and the selecting at least comprises:

comparing the energy consumption level of the mobile device and the energy consumption level for each of the plurality of nodes, and selecting a direct link to the wireless wide area network if the energy consumption level of the mobile device is lower than the energy consumption level for the plurality of nodes, or selecting an indirect link to the wireless wide area network if the energy consumption level of at least one of the plurality of nodes is less than the energy consumption level of the mobile device; and a third set of codes for causing the computer to utilize a credential of the mobile device to communicate with a wireless wide area network through the one node selected as the wireless wide area network communicator.

19. At least one processor configured to select a wireless wide area network communicator, comprising:

a first module for evaluating whether an energy level is mitigated by usage of a communicator selected from a plurality of communicators;

a second module for selecting the communicator at least comprising:

comparing the energy consumption level of the wireless communications apparatus and an energy consumption level for each of the plurality of communicators, and utilizing a direct link to communicate with a wireless wide area network if the energy consumption level of the wireless communications apparatus is lower than the energy consumption level of each of the plurality of communicators, or utilizing an indirect link to communicate with the wireless wide area network if the energy consumption level of at least one of the plurality of communicators is less than the energy consumption level of the wireless communications apparatus;

a third module for supplying a credential to the communicator; and a fourth module for communicating with the wireless wide area network through a modem of the communicator with the credential.

20. A method, performed by a node, for receiving packets intended for a client device in a wireless wide area network, comprising:

receiving a first set of packets from the wireless wide area network and buffering the first set of packets for a defined period of time, wherein the first set of packets are intended for the client device;

selectively conveying the first set of packets from the wireless wide area network to the client device, wherein the node was selected by the client device to mitigate resource consumption at the client device; and determining a best estimate of a set of received packets based on reception of the first set of packets from the wireless wide area network, and based on reception of a second set of packets by a shared node that receives from, but does not transmit to, the wireless wide area network.

21. The method of claim 20, further comprising:

transmitting packets to the wireless wide area network on behalf of the client device.

22. The method of claim 20, wherein selectively conveying the first set of packets comprises terminating a subset of client applications locally.

23. The method of claim 20, wherein selectively conveying the first set of packets comprises forwarding the first set of packets to another device that accepts the first set of packets for the client device.

24. The method of claim 20, further comprising:
selecting a most energy efficient subset of wireless modems for communication, wherein the most energy efficient subset of wireless modems meets at least one parameter for delivery of information and wherein there are a plurality of wireless modems available between the node and the client device.

25. The method of claim 20, further comprising:
receiving physical channels or radio bearers assigned to the node for use on behalf of the client device.

26. The method of claim 20, further comprising:
receiving logical channels or radio bearers assigned to the node for use on behalf of the client device.

27. The method of claim 20, further comprising:
allowing the client device to sleep when there is no information to communicate to the client device or when there is no information flow from the node to the client device for a specific interval.

28. The method of claim 20, further comprising:
processing a subset of computational tasks associated with the client device and one or more communication tasks before selectively conveying the first set of packets from the wireless wide area network to the client device.

29. The method of claim 20, further comprising:
aggregating prior buffered information with information from the first set of packets before selectively conveying the first set of packets from the wireless wide area network to the client device.

30. The method of claim 20, further comprising:
processing the first set of packets before selectively conveying the first set of packets from the wireless wide area network to the client device.

31. The method of claim 30, further comprising:
determining, based on the processing, whether to transmit information related to the first set of packets.

32. The method of claim 20, further comprising:
partitioning tasks related to the client device between the node and the client device, wherein the partitioning is a function of an energy level of the client device, an energy level of the node, an amount of energy spent by the client device and the node based on a partitioning, a performance of wireless wide area networking links and peer to peer links, a delay associated with a task partitioning, or combinations thereof.

33. A method, performed by a node, for receiving packets intended for a client device in a wireless wide area network, comprising:
receiving a first set of packets from the wireless wide area network and buffering the first set of packets, wherein the first set of packets are intended for the client device;
waking up the client device to selectively deliver the first set of packets to the client device via the wireless wide area network after a delay, wherein the node was selected by the client device to mitigate resource consumption at the client device; and
determining a best estimate of a set of received packets based on reception of the first set of packets from the wireless wide area network, and based on reception of a second set of packets by a shared node that receives from, but does not transmit to, the wireless wide area network.

34. A wireless communications apparatus, comprising:
a memory that retains instructions related to:
receiving a first set of packets from a wireless wide area network and buffering the first set of packets for a defined period of time, wherein the first set of packets are intended for a client device,
selectively conveying the first set of packets from the wireless wide area network to the client device, wherein the wireless communications apparatus was selected by the client device to mitigate resource consumption at the client device, and
determining a best estimate of a set of received packets based on reception of the first set of packets from the wireless wide area network, and based on reception of a second set of packets by a shared node that receives from, but does not transmit to, the wireless wide area network; and
a processor, coupled to the memory, configured to execute the instructions retained in the memory.

35. The wireless communications apparatus of claim 34, the memory retains further instructions related to transmitting packets to the wireless wide area network on behalf of the client device.

36. The wireless communications apparatus of claim 34, wherein the set of instructions for selectively conveying the first set of packets from the wireless wide area network to the client device further terminates a subset of client applications locally or forwards the first set of packets to another device that accepts the first set of packets for the client device.

37. The wireless communications apparatus of claim 34, the memory retains further instructions related to selecting a most energy efficient subset of wireless modems for communication, wherein the most energy efficient subset of wireless modems meets at least one parameter for delivery of information and wherein there are a plurality of wireless modems available between the wireless communications apparatus and the client device.

38. The wireless communications apparatus of claim 34, wherein the memory retains further instructions related to receiving physical channels or radio bearers assigned to the wireless communications apparatus for use on behalf of the client device or related to receiving logical channels or radio bearers assigned to the wireless communications apparatus for use on behalf of the client device.

39. A wireless communications apparatus, comprising:
means for receiving a first set of packets from a wireless wide area network and means for buffering the first set of packets for a defined period of time, wherein the first set of packets are intended for a client device;
means for conveying the first set of packets from the wireless wide area network to the client device, wherein the wireless communications apparatus was selected by the client device to mitigate resource consumption at the client device; and
means for determining a best estimate of a set of received packets based on reception of the first set of packets from the wireless wide area network, and based on reception of a second set of packets by a shared node that receives from, but does not transmit to, the wireless wide area network.

* * * * *